United States Patent
Li et al.

(10) Patent No.: US 9,596,160 B1
(45) Date of Patent: Mar. 14, 2017

(54) METHODS FOR BUILT-IN SELF-MEASUREMENT OF JITTER FOR LINK COMPONENTS

(71) Applicant: ALTERA CORPORATION, San Jose, CA (US)

(72) Inventors: Peng Li, Palo Alto, CA (US); Masashi Shimanouchi, San Jose, CA (US); Hsinho Wu, Santa Clara, CA (US)

(73) Assignee: Altera Corporation, San Jose, CA (US)

(*) Notice: Subject to any disclaimer, the term of this patent is extended or adjusted under 35 U.S.C. 154(b) by 43 days.

(21) Appl. No.: 14/529,912

(22) Filed: Oct. 31, 2014

(51) Int. Cl.
*H04L 12/26* (2006.01)

(52) U.S. Cl.
CPC .................... *H04L 43/087* (2013.01)

(58) Field of Classification Search
CPC ..................................... H04W 24/06
USPC ................................. 370/259, 249
See application file for complete search history.

(56) References Cited

U.S. PATENT DOCUMENTS

| | | | |
|---|---|---|---|
| 7,564,897 B2 | 7/2009 | Ichiyama et al. | |
| 7,912,166 B2 | 3/2011 | Hsu et al. | |
| 7,957,458 B2 | 6/2011 | Ichiyama et al. | |
| 8,283,933 B2 | 10/2012 | Dasnurkar | |
| 8,811,458 B2 | 8/2014 | Kong et al. | |
| 2004/0071389 A1* | 4/2004 | Hofmeister | H04B 10/40 385/16 |
| 2004/0267481 A1* | 12/2004 | Resnick | G11C 29/26 702/117 |
| 2005/0193290 A1 | 9/2005 | Cho et al. | |
| 2009/0304054 A1* | 12/2009 | Tonietto | H04L 1/205 375/221 |

* cited by examiner

*Primary Examiner* — Omar Ghowrwal
*Assistant Examiner* — Angel Brockman
(74) *Attorney, Agent, or Firm* — Okamoto & Benedicto LLP

(57) ABSTRACT

One embodiment of the present invention relates to a method for built-in self-measurement (BISM) of jitter components. A built-in self-measurement controller on the host integrated circuit (and, in some cases, a slave controller on a partner integrated circuit) may be used to control various switches to form various loopback circuits. A calibrated jittery data pattern is transmitted through each of the various loopback circuits. On-die instrumentation (ODI) circuitry may then be used to measure intrinsic jitter components for each loopback circuit via data representations such as eye-diagrams, or jitter histograms, or bit error ratio bathtub curves. The intrinsic jitter for link components (i.e. the jitter components such as deterministic jitter (DJ), random jitter (RJ), total jitter (TJ)) may then be determined based on the measured intrinsic jitters for the various loopback circuits. Other embodiments and features are also disclosed.

9 Claims, 18 Drawing Sheets

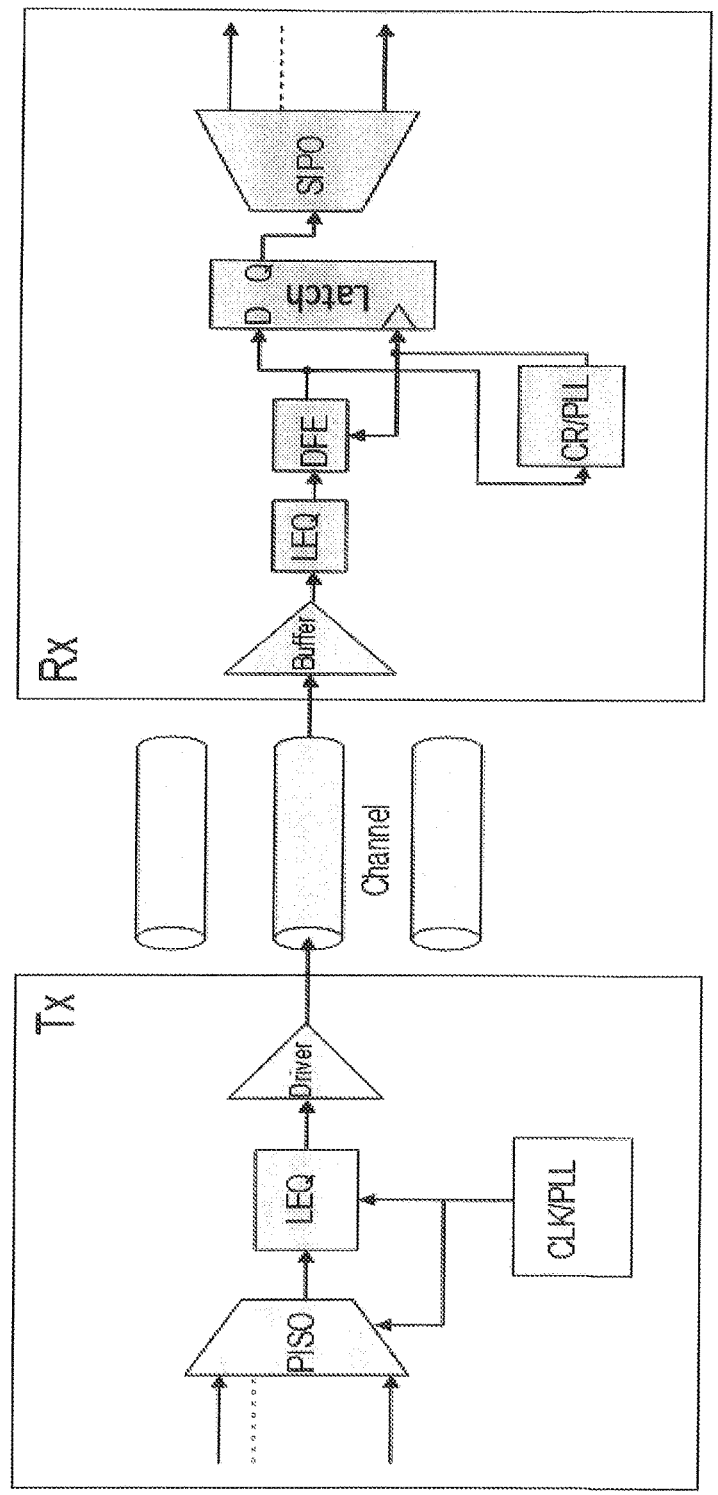
FIG. 1
(Conventional)

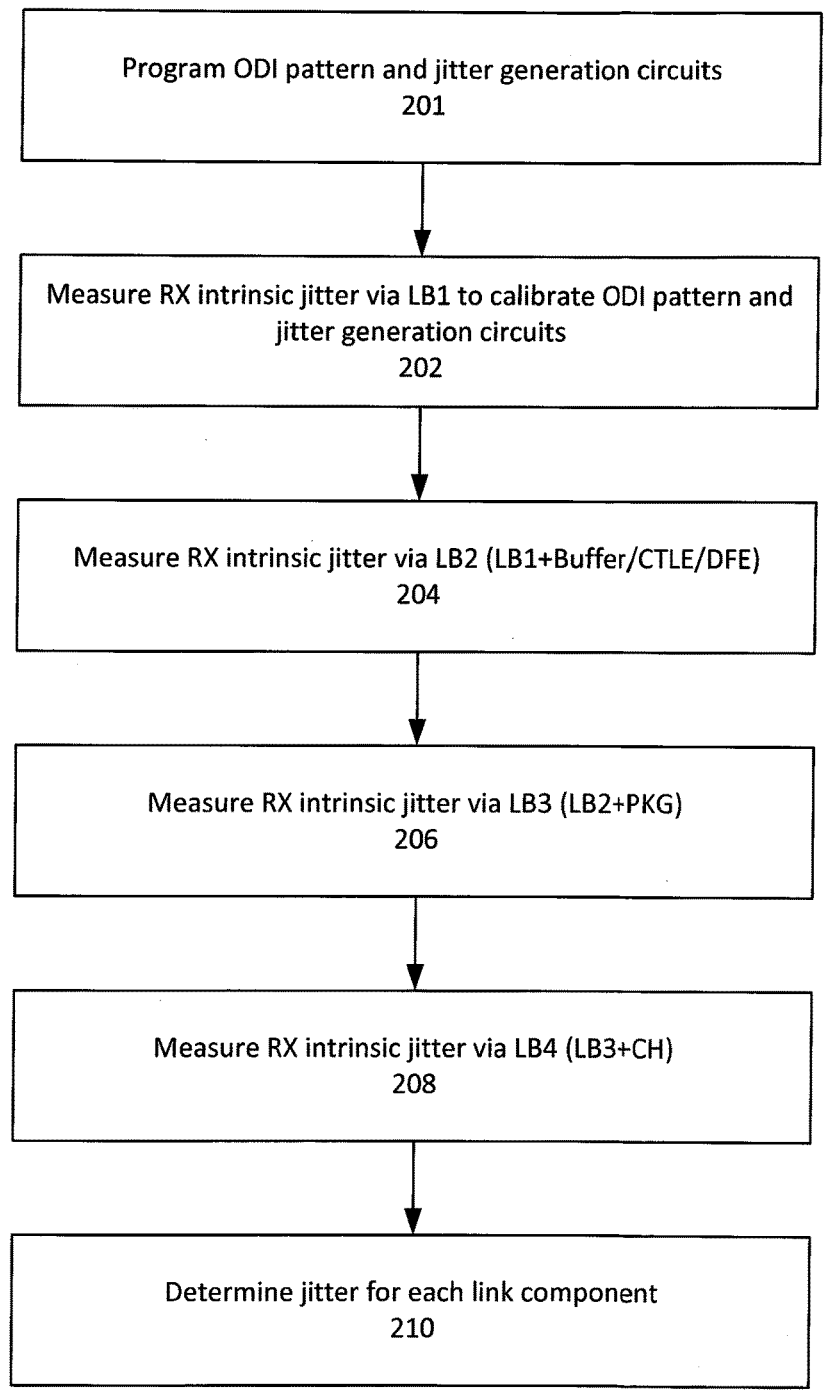
FIG. 2    200

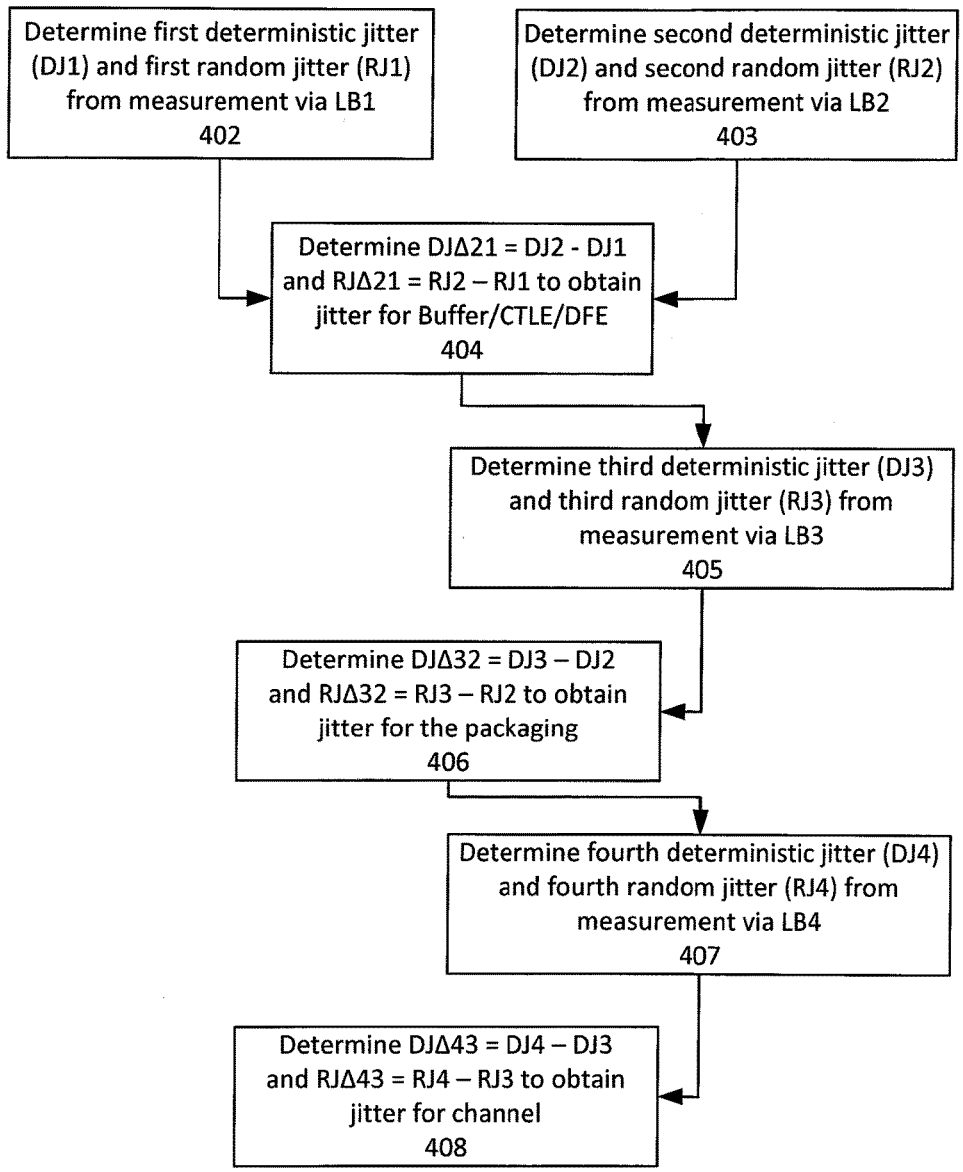
FIG. 4     400

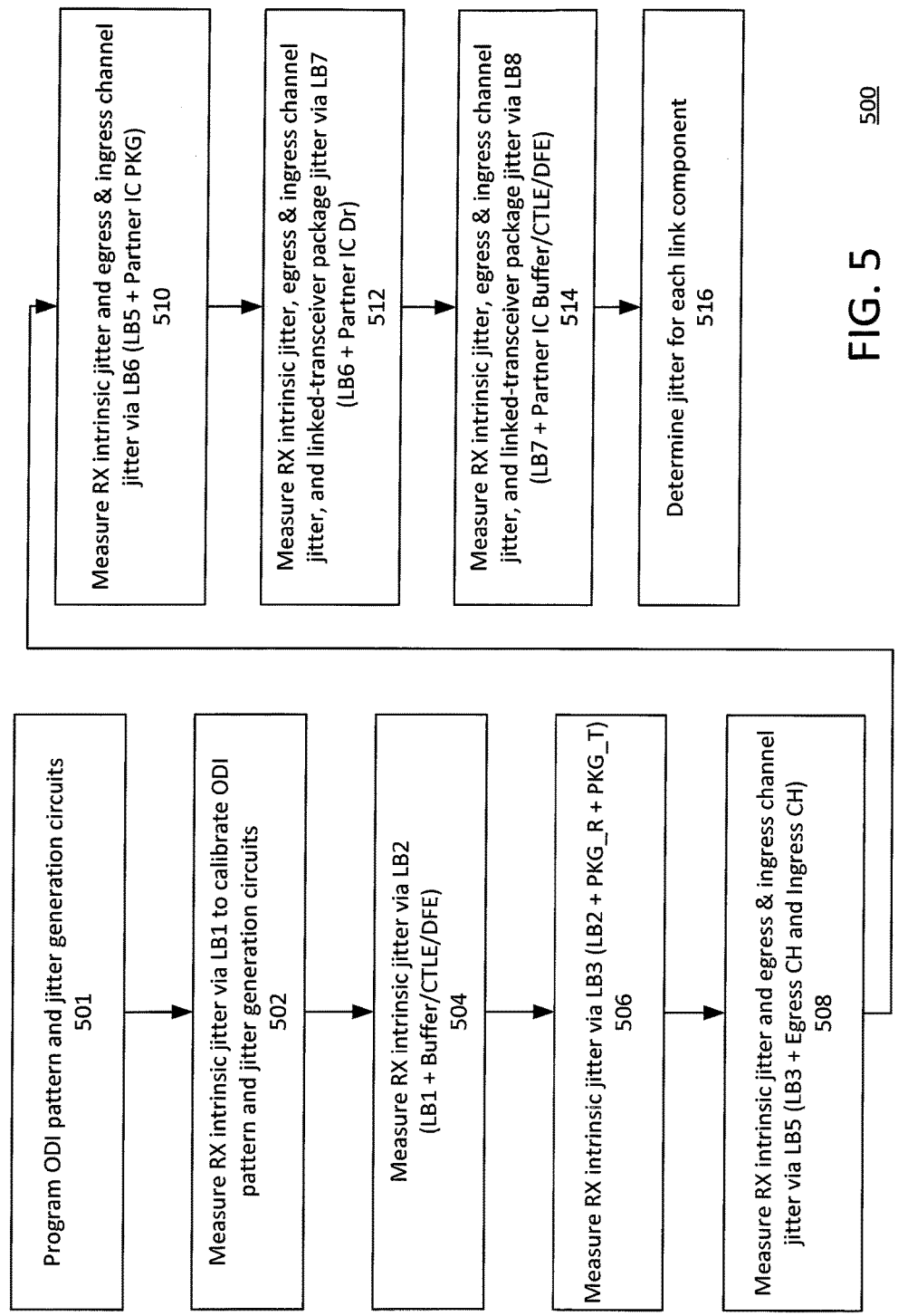

METHODS FOR BUILT-IN SELF-MEASUREMENT OF JITTER FOR LINK COMPONENTS

TECHNICAL FIELD

The present invention relates generally to high-speed data communication links. More particularly, the present invention relates to methods and apparatus for determining jitter of link components of a high-speed data communication link.

DESCRIPTION OF THE BACKGROUND ART

There is increasing use of high-speed serial data communication for exchange of data between the devices that make up various types of systems. As the speed of such communication links continue to increase, it is increasingly difficult in the link design process to provide for accurate design simulation and validation and also to provide accurate performance and margin estimations over process, voltage and temperature (PVT) variations. It also becomes problematic to provide for accurate diagnostic and debugging capabilities such that work-around solutions may be quickly found over PVT variations.

SUMMARY

The present disclosure provides a technique for built-in self-measurement (BISM) of jitter components. A BISM controller on a host device (and, in some cases, a slave controller on a partner device) may be used to control various switches to form various loopback circuits. A calibrated jittery data pattern is transmitted through each of the various loopback circuits. On-die instrumentation (ODI) circuitry may then be used to measure intrinsic jitter components for each loopback circuit via data representations such as eye-diagrams, or jitter histograms, or bit error ratio bathtub curves. The intrinsic jitter for link components (i.e. the jitter components such as deterministic jitter (DJ), random jitter (RJ), total jitter (TJ)) may then be determined based on the measured intrinsic jitters for the various loopback circuits.

Other embodiments, aspects and features are also disclosed herein.

BRIEF DESCRIPTION OF THE DRAWINGS

FIG. 1 depicts select components of an exemplary one-way point-to-point link in accordance with an embodiment of the invention.

FIG. 2 is a flow chart of a first method of measuring receiver jitter components in accordance with an embodiment of the invention.

FIG. 4 is a flow chart of a procedure to determine deterministic and random jitter components using measurements from the method of FIG. 2 in accordance with an embodiment of the invention.

FIG. 5 is a flow chart of a second method of measuring receiver jitter components in accordance with an embodiment of the invention.

DETAILED DESCRIPTION

Figure 3A:
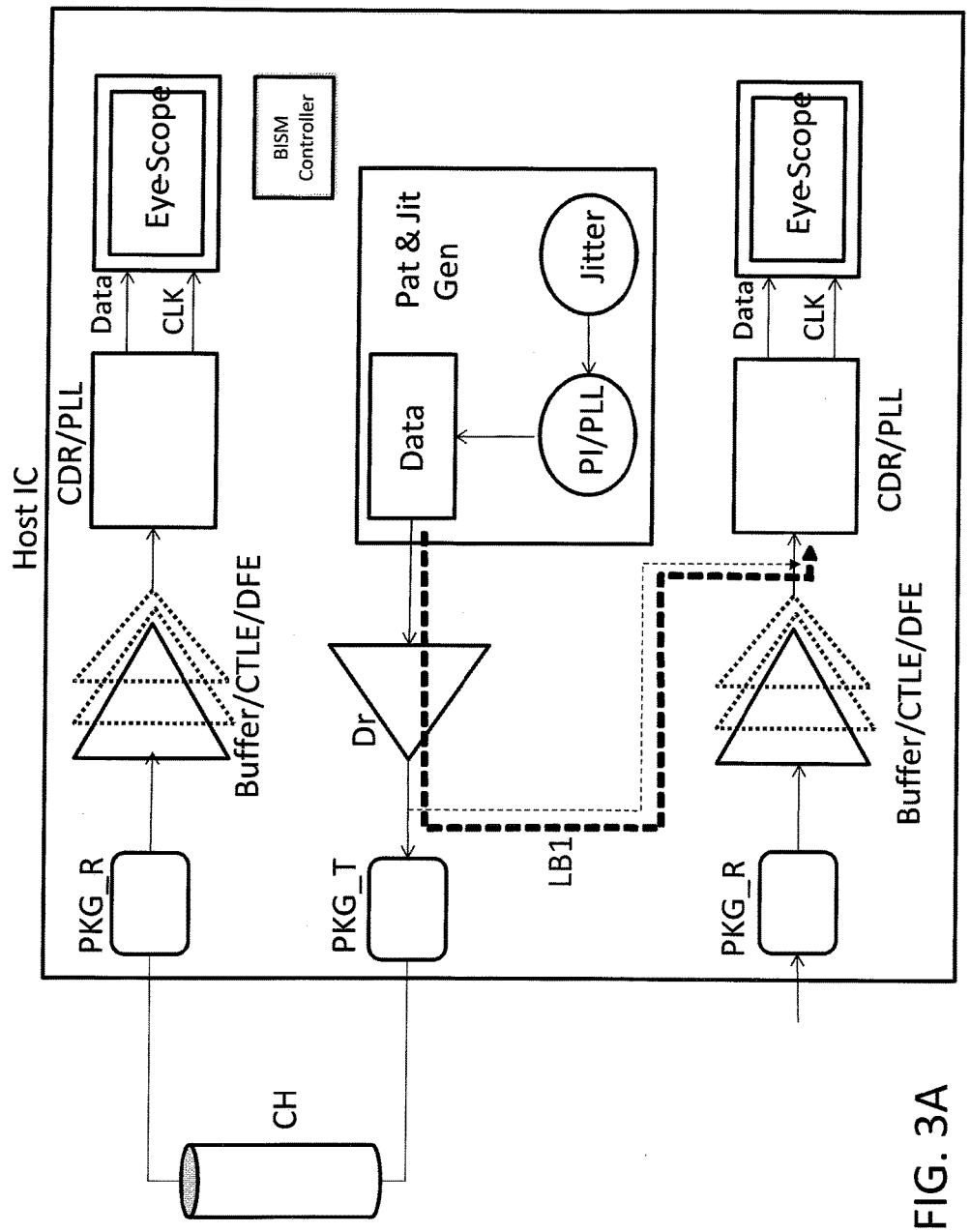
FIG. 3A depicts loopback circuit LB1 for the method of FIG. 2 in accordance with an embodiment of the invention.

The presently-disclosed technique for determining jitter components of a communication link may utilize a BISM controller on the host integrated circuit (and, in some cases, a slave controller on a partner integrated circuit) to control various switches to form various loopback circuits. A calibrated jittery data pattern is transmitted through each of the various loopback circuits. On-die instrumentation (ODI) circuitry may then be used to measure an intrinsic jitter for each loopback circuit via data representations such as eye-diagrams, or jitter histograms, or bit error ratio bathtub curves. The intrinsic jitter for link components (i.e. the jitter components) may then be determined based on the measured intrinsic jitters for the various loopback circuits.

Advantageously, the presently-disclosed technique for determining jitter components provides for accurate performance and margin estimations over PVT variations. It also provides for accurate diagnostic and debugging capabilities such that work-around solutions may be quickly found over PVT variations.

Furthermore, the presently-disclosed technique advantageously provides for real-time and detailed link performance monitoring. Improved characterizations over PVT variations are also enabled.

FIG. 1 depicts select components of an exemplary one-way point-to-point link in accordance with an embodiment of the invention. As shown, the link includes a communication channel (Channel) connecting a transmitter device (Tx) and a receiver device (Rx). The Channel may be a serial channel or a multiple-lane channel.

The transmitter may include a parallel-in-serial-out (PISO) circuit that receives a parallel data input and converts it to a serial data output. The transmitter may further include a linear equalizer (LEQ) that adjusts the data signal with pre-emphasis prior to the data signal being driven onto the Channel by a driver circuit (Driver). For example, the linear equalizer may use a finite impulse response filter. A clock generator (CLK) may use a phase-locked loop (PLL) to generate and condition a reference clock source that is provided to the PISO and the LEQ.

The receiver includes a data input buffer (Buffer) that receives the transmitted data signal from the Channel. The receiver further includes receiver equalization circuitry that equalizes the received data signal. As shown, the receiver equalization circuitry may include a linear equalizer (LEQ) and a decision feedback equalization (DFE). The receiver equalization circuitry outputs an equalized data signal to a data latch (Latch) and also to a clock recovery (CR) circuit that includes a phase-locked loop (PLL). The CR/PLL circuit may output a recovered clock signal to the Latch and the DFE.

FIG. 2 is a flow chart of a first method 200 of measuring receiver jitter components in accordance with an embodiment of the invention. The method 200 may be performed under control of firmware or software to implement the measurement procedure and jitter determination algorithm. The method 200 is centered on the transceiver device (Host IC) and uses four loopback circuits (LB1, LB2, LB3 and LB4) that are described below in relation to FIGS. 3A-3D.

The method 200 may utilize a Built-In Self-Measurement controller (Master Controller) on the Host IC to control various switches to form various loopback circuits, transmit a calibrated jittery data pattern through the loopback circuits, and measure intrinsic jitter components for each loopback circuit via data representations such as eye diagrams, or jitter histograms, or bit error ratio bathtub curves. The Master Controller may be implemented by electronically-programmed logic of the Host IC, or by program instructions executed by a microcontroller embedded in the Host IC, or by hard-wired logic circuitry of the Host IC, or by a combination thereof.

An initial step 201 of the method 200 involves setting up the stimulus signal with a data pattern. In an exemplary implementation, the data pattern may be a pseudo-random binary sequence (PRBS), such as PRBS 2^15−1. Other data patterns may be used in other implementations. The data pattern may be implemented by programming on-die instrumentation (ODI) pattern and jitter generating (Pat & Jit Gen) circuit. The Pat & Jit Gen circuit may use a jitter generator (Jitter) circuit and a phase interpolator/phase-locked loop (PI/PLL) to modify a data pattern (Data) to create a jittery data pattern that is output by the Pat & Jit Gen circuit.

A next step 202 of the method 200 involves performing a first calibration measurement using the loopback circuit LB1 which is depicted in FIG. 3A. As shown in FIG. 3A, the loopback circuit LB1 goes from the Pat & Jit Gen circuit, to the driver (Dr) circuit, to the clock data recovery/phase-locked loop (CDR/PLL) circuit, and, finally, to the eye-scope (Eye-Scope) circuit.

This first calibration measurement measures and obtains intrinsic jitter components, namely the deterministic jitter ($DJ_1$) and random jitter ($RJ_1$), for the loopback circuit LB1. This effectively provides the deterministic jitter and random jitter floors of the combined circuit that includes both the ODI pattern and jitter generation circuit and the Eye-Scope circuit. With the jitter component floors, the Pat & Jit Gen circuit may be deemed to be calibrated by fixing its settings such that it generates a calibrated jittery data pattern.

Figure 3B:
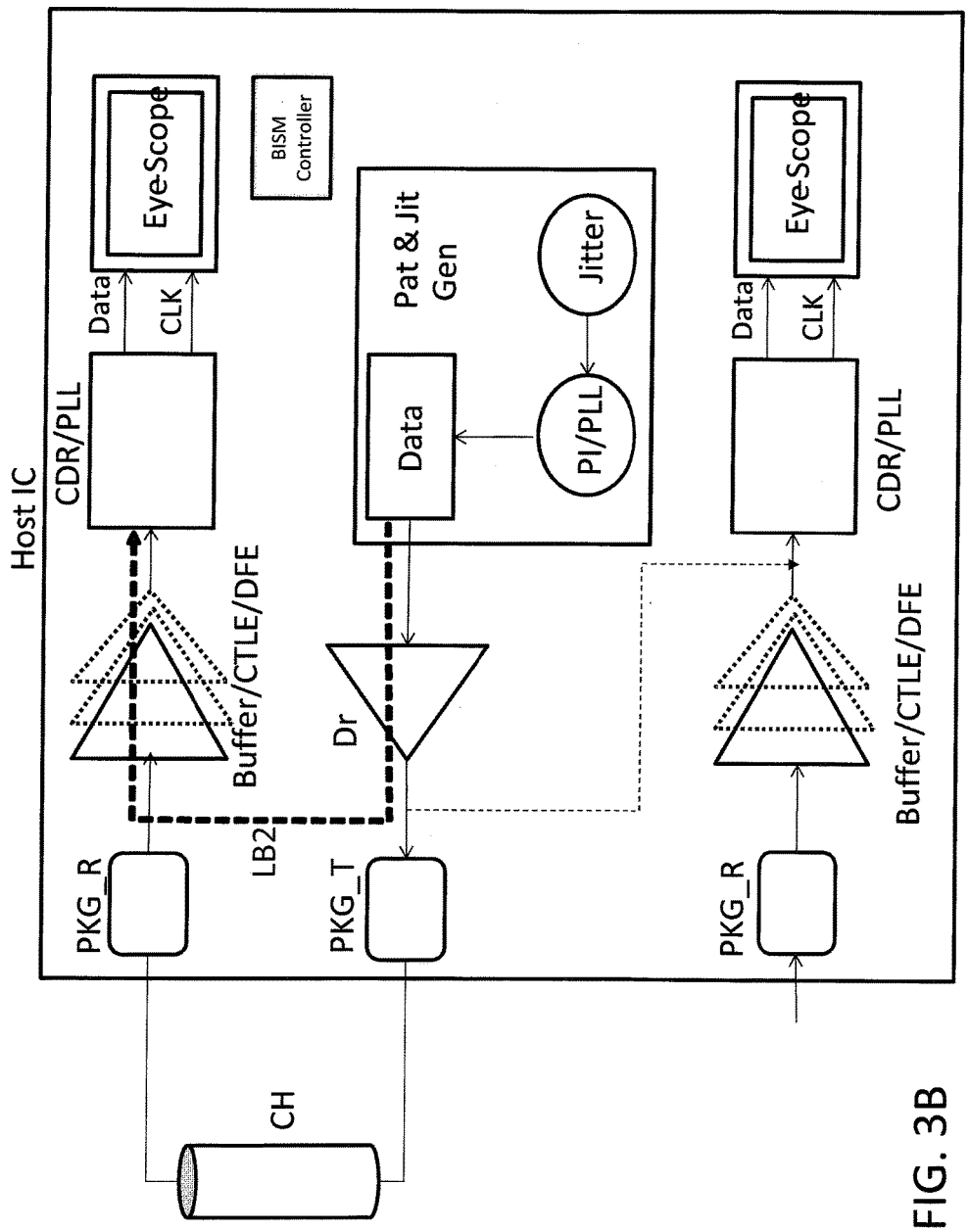
FIG. 3B depicts loopback circuit LB2 for the method of FIG. 2 in accordance with an embodiment of the invention.

A next step 204 of the method 200 involves performing a second calibration measurement using the loopback circuit LB2 which is depicted in FIG. 3B. As shown in FIG. 3B, the loopback circuit LB2 goes from the Pat & Jit Gen circuit, to the Dr circuit, to a combination of the receiver buffer, continuous-time linear equalizer and decision feedback equalizer (Buffer/CTLE/DFE) circuits, to the CDR/PLL circuit, and, finally, to the Eye-Scope circuit.

This second calibration measurement may be implemented by connecting the calibrated jittery data pattern to the input of the receiver at the buffer pad and measuring the bit error rate (BER) bathtub curve with the Eye-Scope circuit. Jitter components of the loopback circuit LB2 may be obtained from this BER bathtub curve. This enables determination of the jitter components of the combined Buffer/CTLE/DFE circuit relative to the jitter component floors.

Figure 3C:
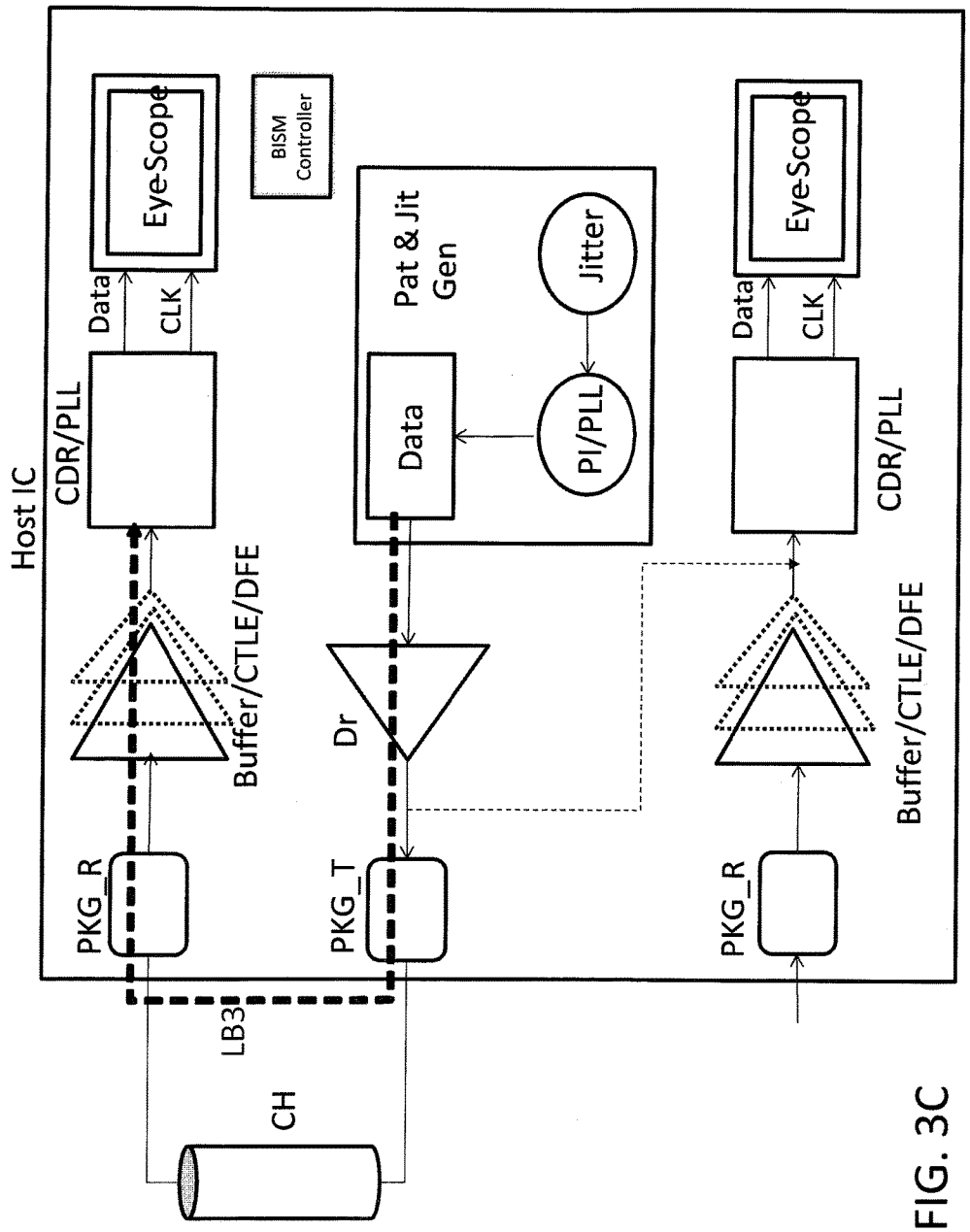
FIG. 3C depicts loopback circuit LB3 for the method of FIG. 2 in accordance with an embodiment of the invention.

A next step 206 of the method 200 involves performing a third calibration measurement using the loopback circuit LB3 which is depicted in FIG. 3C. As shown in FIG. 3C, the loopback circuit LB3 goes from the Pat & Jit Gen circuit, to the Dr circuit, through the transmitter packaging (PKG_T) and receiver packaging (PKG_R), to the combined Buffer/CTLE/DFE circuit, to the CDR/PLL circuit, and, finally, to the Eye-Scope circuit.

This third calibration measurement may be implemented by connecting the calibrated jittery data pattern to the input of the receiver at the ball or pin of the package and measuring the BER bathtub curve with the Eye-Scope circuit. Jitter components of the loopback circuit LB3 may be obtained from this BER bathtub curve. In a case where the PKG_T characteristics are known, this enables determination of the jitter components of the PKG_R and the combined Buffer/CTLE/DFE circuit relative to the jitter component floors.

Figure 3D:
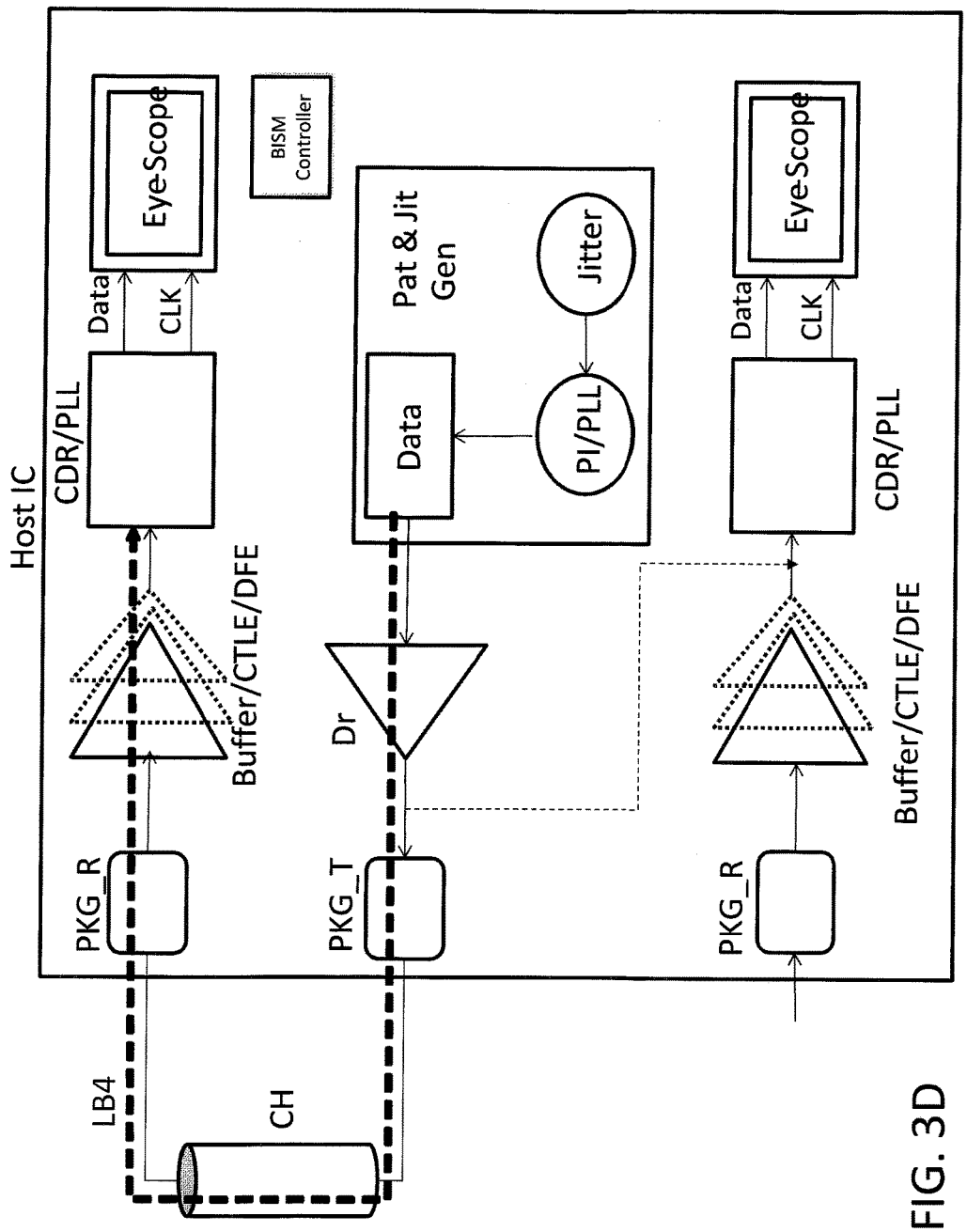
FIG. 3D depicts loopback circuit LB4 for the method of FIG. 2 in accordance with an embodiment of the invention.

A next step 208 of the method 200 involves performing a fourth calibration measurement using the loopback circuit LB4 which is depicted in FIG. 3D. As shown in FIG. 3D, the loopback circuit LB4 goes from the Pat & Jit Gen circuit, to the Dr circuit, to PKG_T, through the communication channel (CH), to PKG_R, to the combined Buffer/CTLE/DFE circuit, to the CDR/PLL circuit, and, finally, to the Eye-Scope circuit.

This fourth calibration measurement may be implemented by connecting the calibrated jittery data pattern at the package ball to the input of an embedded physical channel (CH) that is external to the receiver. For example, the embedded physical channel may be implemented on a printed circuit board (PCB) or using a backplane. The other end of the channel may be connected to the package ball (or pin) of the receiver. The BER bathtub curve is measured with the eye-scope circuits. Jitter components of the loopback circuit LB4 may be obtained from this BER bathtub curve. In a case where the transmission package characteristics are known, this enables determination of the jitter components of the PKG_R, the CH, and the combined Buffer/CTLE/DFE circuit relative to the jitter component floors.

Finally, per step 210, using the above-discussed calibration measurements, the deterministic jitter (DJ) and random jitter (RJ) may be determined for each link component. In accordance with an embodiment of the invention, the procedure 400 described below in relation to FIG. 4 may be used for this step.

Per step 402 in FIG. 4, a first deterministic jitter (DJ1) and a first random jitter (RJ1) may be obtained from the first calibration measurement via LB1 (i.e. from step 202). DJ1 and RJ1 provide, respectively, the deterministic jitter floor and random jitter floor relating to the Pat & Jit Gen, Dr, CDR/PLL and Eye-Scope circuitry.

Per step 403, a second deterministic jitter (DJ2) and a second random jitter (RJ2) may be obtained from the second calibration measurement via LB2 (i.e. from step 204). DJ2 and RJ2 provide, respectively, the deterministic jitter and the random jitter relating to the Pat & Jit Gen, Dr, Buffer/CTLE/DFE, CDR/PLL and Eye-Scope circuitry.

Per step 404, DJΔ21 may be calculated to be the difference between DJ2 and DJ1, and RJΔ21 may be calculated to be the difference between RJ2 and RJ1. The deterministic jitter for the combined Buffer/CTLE/DFE circuits is provided by DJΔ21, and the random jitter for the combined Buffer/CTLE/DFE circuits is provided by RJΔ21.

Per step 405, a third deterministic jitter (DJ3) and a third random jitter (RJ3) may be obtained from the third calibration measurement via LB3 (i.e. from step 206). DJ3 and RJ3 provide, respectively, the deterministic jitter and the random jitter relating to the Pat & Jit Gen, Dr, PKG_T, PKG_R, Buffer/CTLE/DFE, CDR/PLL and Eye-Scope circuitry.

Per step 406, DJΔ32 may be calculated to be the difference between DJ3 and DJ2, and RJΔ32 may be calculated to be the difference between RJ3 and RJ2. The deterministic jitter for the packaging (PKG_T and PKG_R) is provided by DJΔ32, and the random jitter for the packaging (PKG_T and PKG_R) i is provided by RJΔ32. For the case where the characteristics of the transmitter packaging (PKG_T) is known, this allows for the determination of the deterministic and random jitter components for PKG_R.

Per step 407, a fourth deterministic jitter (DJ4) and a fourth random jitter (RJ4) may be obtained from the fourth calibration measurement via LB4 (i.e. from step 208). DJ4 and RJ4 provide, respectively, the deterministic jitter and the random jitter relating to the Pat & Jit Gen, Dr, PKG_T, CH, PKG_R, Buffer/CTLE/DFE, CDR/PLL and Eye-Scope circuitry.

Lastly, per step 408, DJΔ43 may be calculated to be the difference between DJ4 and DJ3, and RJΔ43 may be calculated to be the difference between RJ4 and RJ3. The deterministic jitter for the channel is provided by DJΔ43, and the random jitter for the channel is provided by RJΔ43.

FIG. 5 is a flow chart of a second method 500 of measuring receiver jitter components in accordance with an embodiment of the invention. The method 500 may be performed under control of firmware or software to implement the measurement procedure and jitter determination algorithm. The method 500 is centered on a transceiver device (Host IC) that is connecting to a partner device (Partner IC). The method 500 uses seven loopback circuits (LB1, LB2, LB3, LB5, LB6, LB7 and LB8) that are described below in relation to FIGS. 6A-6G.

The method 500 may utilize a Built-In Self-Measurement (BISM) controller (Master Controller) on the Host IC in communication with another BISM controller (Slave Controller) on the Partner IC to control various switches to form various loopback circuit, transmit a calibrated jittery data pattern through the loopback circuits, and measure resultant bathtub curves.

The Master Controller may be implemented by electronically-programmed logic of the Host IC, or by program instructions executed by a microcontroller embedded in the Host IC, or by hard-wired logic circuitry of the Host IC, or by a combination thereof. Similarly, the Slave Controller may be implemented by electronically-programmed logic of the Partner IC, or by program instructions executed by a microcontroller embedded in the Partner IC, or by hard-wired logic circuitry of the Partner IC, or by a combination thereof.

An initial step 501 of the method 500 involves setting up the stimulus signal with a data pattern. In an exemplary implementation, the data pattern may be a pseudo-random binary sequence (PRBS), such as PRBS 2^15−1. Other data patterns may be used in other implementations. The data pattern may be implemented by programming on-die instrumentation (ODI) pattern and jitter generating (Pat & Jit Gen) circuit. The Pat & Jit Gen circuit may use a jitter generator (Jitter) circuit and a phase interpolator/phase-locked loop (PI/PLL) to modify a data pattern (Data) to create a jittery data pattern that is output by the Pat & Jit Gen circuit.

Figure 6A:
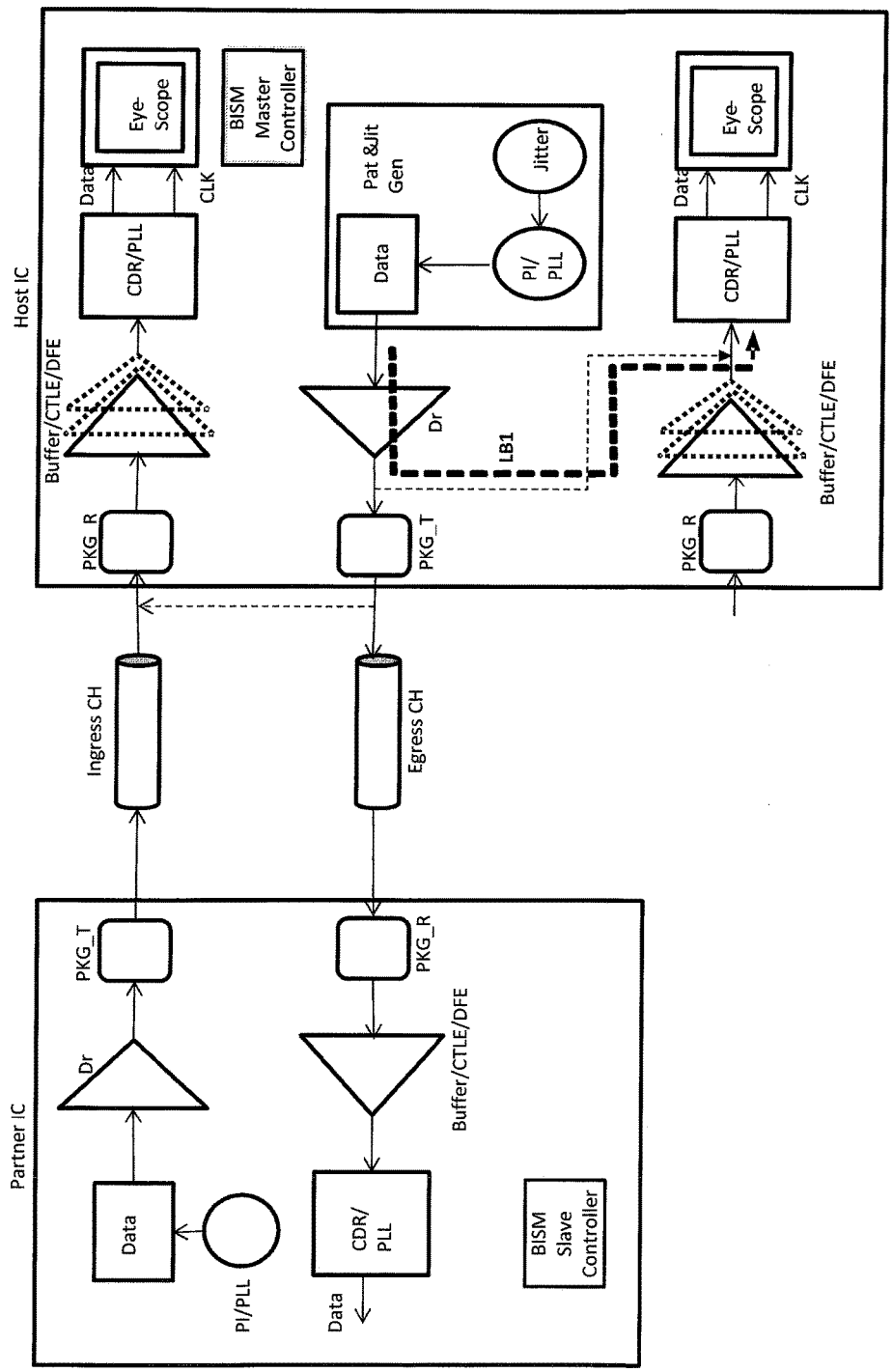
FIG. 6A depicts loopback circuit LB1 for the method of FIG. 5 in accordance with an embodiment of the invention.

A next step 502 of the method 500 involves performing a first calibration measurement using the loopback circuit LB1 which is depicted in FIG. 6A. As shown in FIG. 6A, the loopback circuit LB1 goes from the Pat & Jit Gen circuit, to the driver (Dr) circuit, to the clock data recovery/phase-locked loop (CDR/PLL) circuit, and, finally, to the eye-scope (Eye-Scope) circuit. The loopback circuit LB1 may be formed by connecting temporarily (using electronically-controllable switches) the output of the DR circuit to the input of the CDR/PLL circuit.

This first calibration measurement measures and obtains intrinsic jitter components, namely the deterministic jitter ($DJ_1$) and random jitter ($RJ_1$), for the loopback circuit LB1. This effectively provides the deterministic jitter and random jitter floors of the combined circuit that includes both the ODI pattern and jitter generation circuit and the Eye-Scope circuit. With the jitter component floors, the Pat & Jit Gen circuit may be deemed to be calibrated by fixing its settings such that it generates a calibrated jittery data pattern.

Figure 6B:
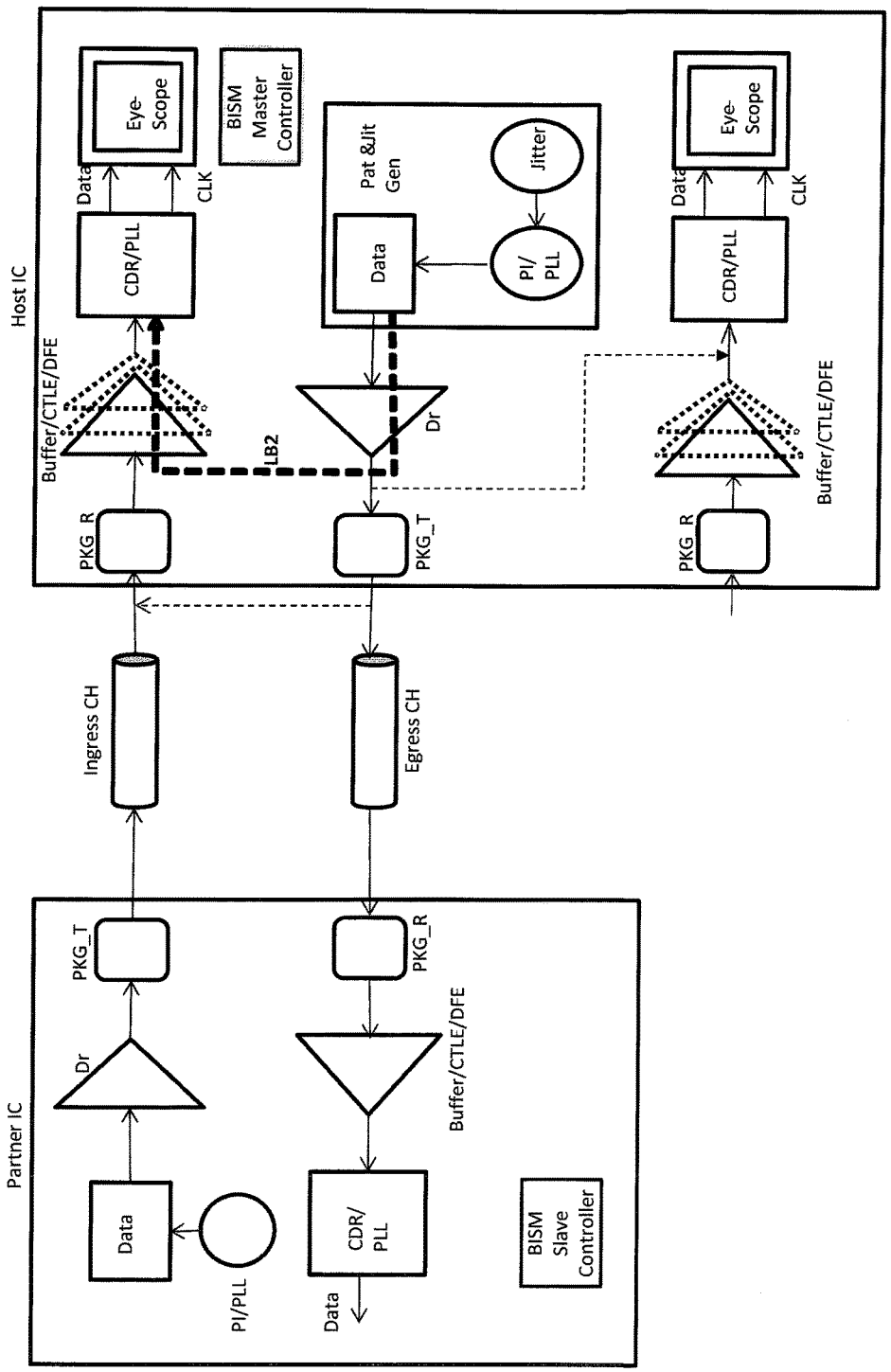
FIG. 6B depicts loopback circuit LB2 for the method of FIG. 5 in accordance with an embodiment of the invention.

A next step 504 of the method 500 involves performing a second calibration measurement using the loopback circuit LB2 which is depicted in FIG. 6B. As shown in FIG. 6B, the loopback circuit LB2 goes from the Pat & Jit Gen circuit, to the Dr circuit, to a combination of the receiver buffer, continuous-time linear equalizer and decision feedback equalizer (Buffer/CTLE/DFE) circuits, to the CDR/PLL circuit, and, finally, to the Eye-Scope circuit.

This second calibration measurement may be implemented by connecting temporarily (using electronically-controllable switches) the calibrated jittery data pattern output by the driver to the input of the receiver at the buffer pad and measuring the bit error rate (BER) bathtub curve with the Eye-Scope circuit. Jitter components of the loopback circuit LB2 may be obtained from this BER bathtub curve. The difference in the jitter components determined using LB2 and those determined using LB1 provides the jitter components of the combined Buffer/CTLE/DFE circuit of the Host IC.

Figure 6C:
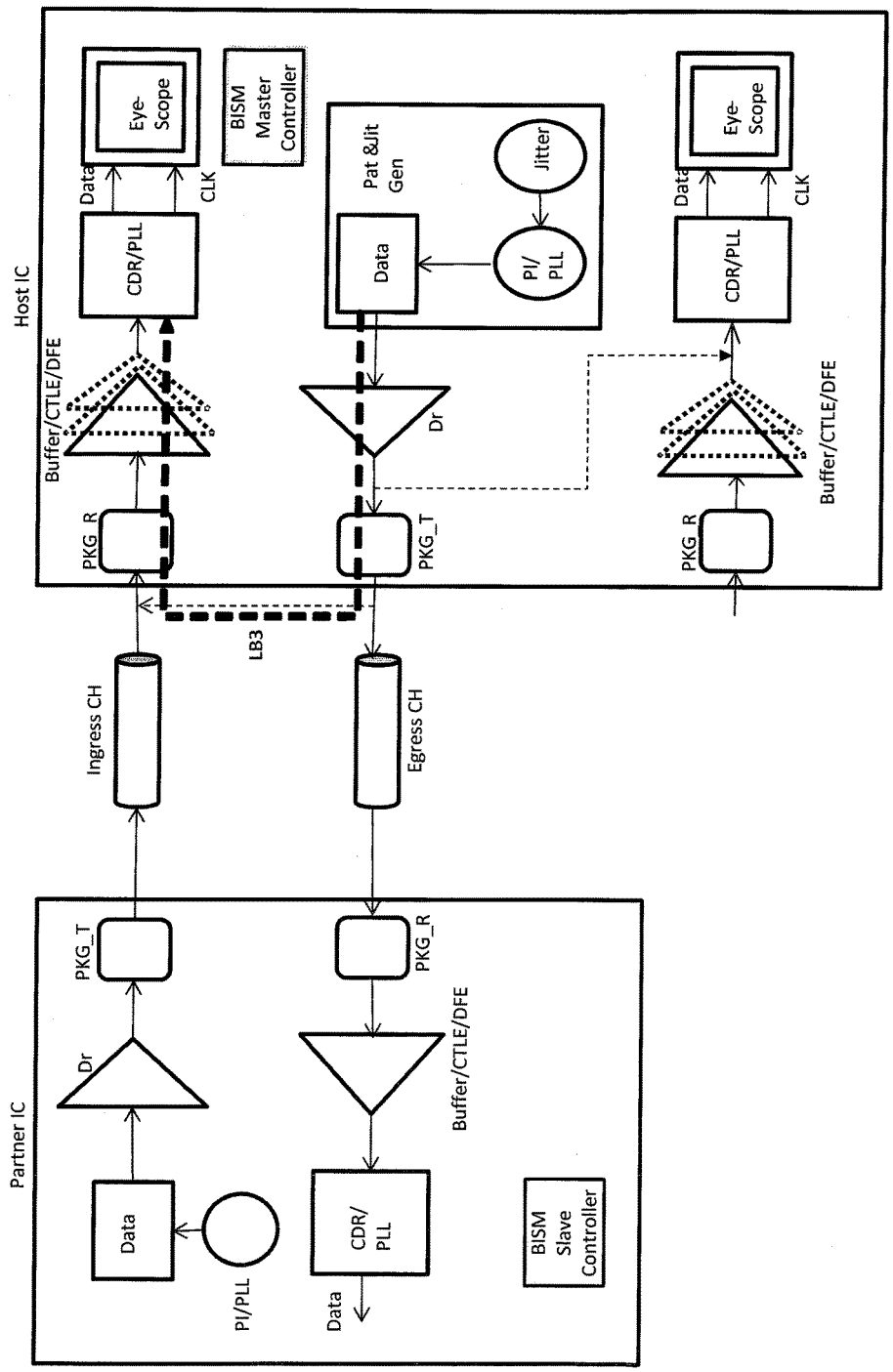
FIG. 6C depicts loopback circuit LB3 for the method of FIG. 5 in accordance with an embodiment of the invention.

A next step 506 of the method 500 involves performing a third calibration measurement using the loopback circuit LB3 which is depicted in FIG. 6C. As shown in FIG. 6C, the loopback circuit LB3 goes from the Pat & Jit Gen circuit, to the Dr circuit, through the transmitter packaging (PKG_T) and receiver packaging (PKG_R), to the combined Buffer/CTLE/DFE circuit, to the CDR/PLL circuit, and, finally, to the Eye-Scope circuit.

This third calibration measurement may be implemented by connecting temporarily (using electronically-controllable switches) the transmitter at the ball or pin of the package (i.e. output from PKG_T) to the input of the receiver at the ball or pin of the package (i.e. to PKG_R). The calibrated jittery data pattern is transmitted through the loopback circuit LB3, and the BER bathtub curve is measured with the Eye-Scope circuit. Jitter components of the loopback circuit LB3 may be obtained from this BER bathtub curve. The difference in the jitter components determined using LB3 and those determined using LB2 provides the jitter components of the PKG_T and PKG_R of the Host IC.

Figure 6D:
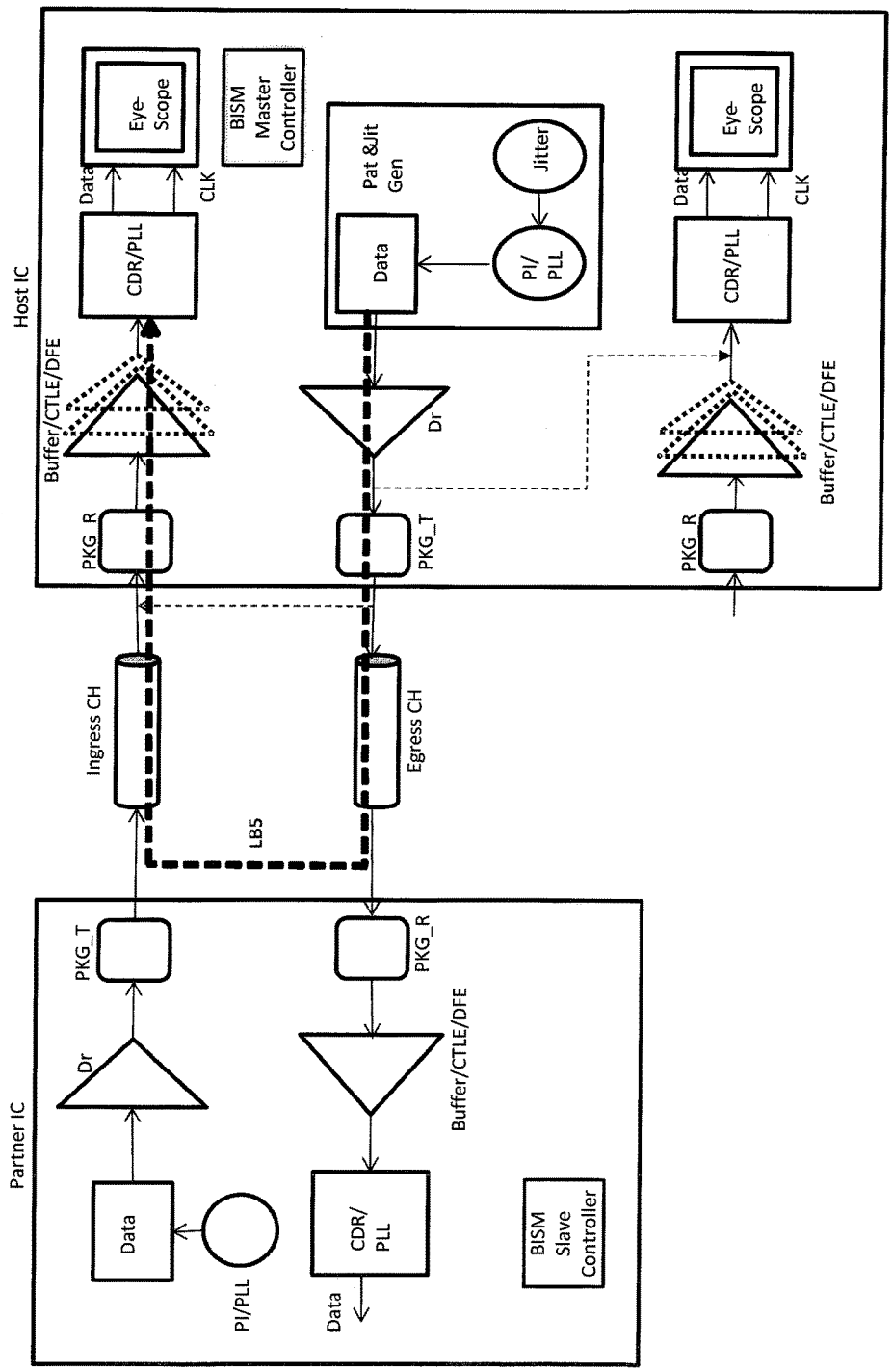
FIG. 6D depicts loopback circuit LB5 for the method of FIG. 5 in accordance with an embodiment of the invention.

A next step 508 of the method 500 involves performing a fourth calibration measurement using the loopback circuit LB5 which is depicted in FIG. 6D. As shown in FIG. 6D, the loopback circuit LB5 goes from the Pat & Jit Gen circuit, to the Dr circuit, to PKG_T, through the egress channel (Egress CH), through the ingress channel (Ingress CH), to PKG_R, to the combined Buffer/CTLE/DFE circuit, to the CDR/PLL circuit, and, finally, to the Eye-Scope circuit.

This fourth calibration measurement may be implemented by connecting the calibrated jittery data pattern at the package ball (or pin) of the transmitter of the Host IC to the input of an egress channel. For example, the egress channel and the ingress channel may be implemented on a printed circuit board (PCB) or using a backplane, from the Host IC point of view. The output of the egress channel may be connected temporarily (using electronically-controllable switches) to an ingress channel input at the Partner IC (circumventing the packaging of the Partner IC) so as to loop back through the Ingress CH to the package ball (or pin) of the receiver of the Host IC at the output of the ingress channel. The BER bathtub curve is measured with the eye-scope circuits, and jitter components of the loopback circuit LB5 may be obtained from this BER bathtub curve. The difference in the jitter components determined using LB5 and those determined using LB3 provides the jitter components of the Egress and Ingress channels.

Figure 6E:
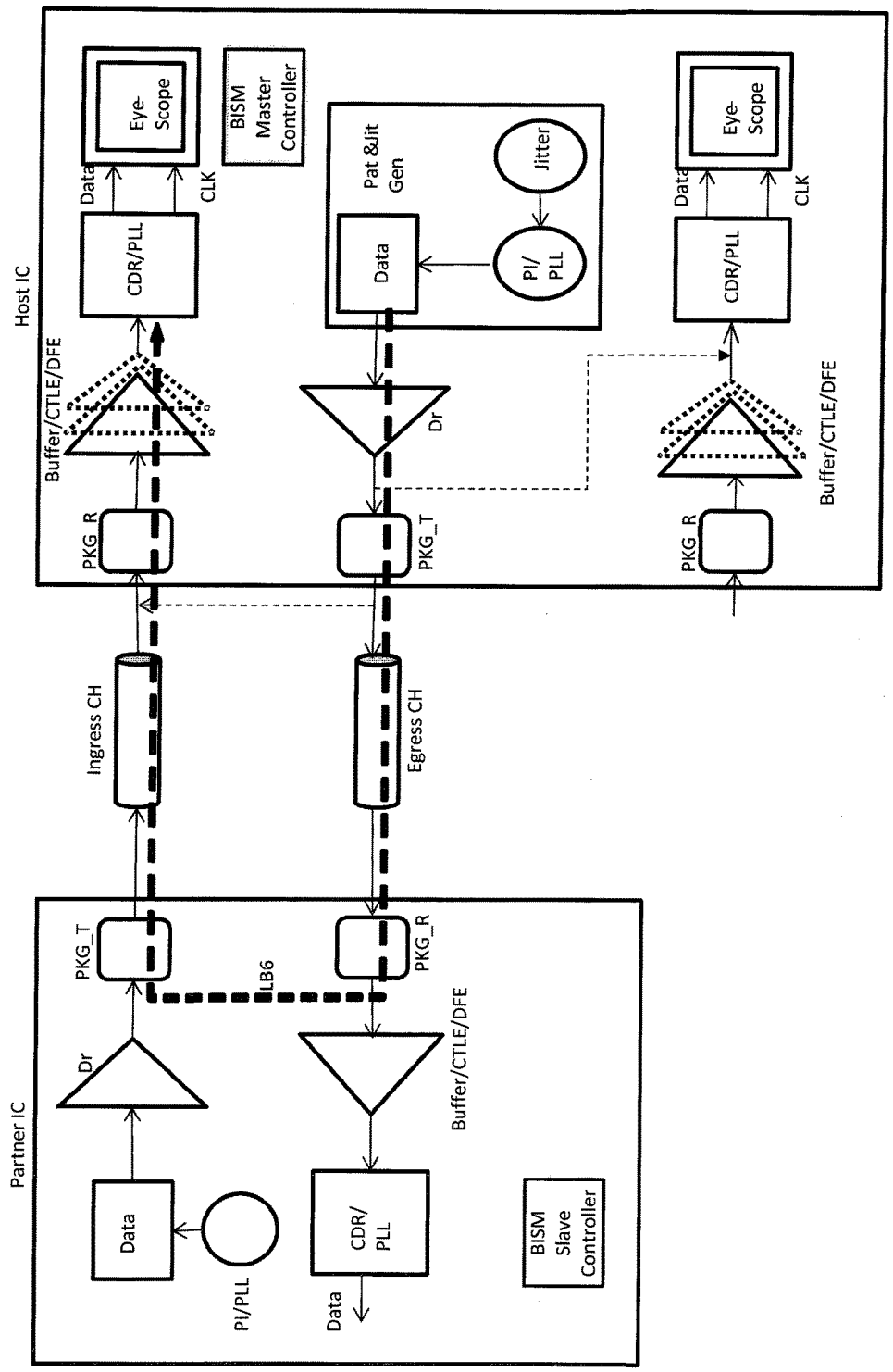
FIG. 6E depicts loopback circuit LB6 for the method of FIG. 5 in accordance with an embodiment of the invention.

A next step 510 of the method 500 involves performing a fifth calibration measurement using the loopback circuit LB6 which is depicted in FIG. 6E. As shown in FIG. 6E, the loopback circuit LB6 goes from the Pat & Jit Gen circuit, to the Dr circuit, to PKG_T of the Host IC, through the egress channel (Egress CH), to PKG_R of the Partner IC, to PKG_T of the Partner IC, through the ingress channel (Ingress CH), to PKG_R of the Host IC, to the combined Buffer/CTLE/DFE circuit, to the CDR/PLL circuit, and, finally, to the Eye-Scope circuit.

This fifth calibration measurement may be implemented by connecting the calibrated jittery data pattern at the package ball (or pin) of the transmitter of the Host IC to the input of an egress channel. For example, the egress channel and the ingress channel may be implemented on a printed circuit board (PCB) or using a backplane, from the Host IC point of view. The output of the egress channel may be connected to the package ball (or pin) of the receiver of the Partner IC, which may be connected temporarily (using electronically-controllable switches) to the package ball (or pin) of the transmitter of the Partner IC so as to loop back through the Ingress CH to the package ball (or pin) of the receiver of the Host IC at the output of the ingress channel. The BER bathtub curve is measured with the eye-scope circuits, and jitter components of the loopback circuit LB6 may be obtained from this BER bathtub curve. The difference in the jitter components determined using LB6 and those determined using LB5 provides the jitter components of the combination of PKG_R and PKG_T of the Partner IC.

Figure 6F:
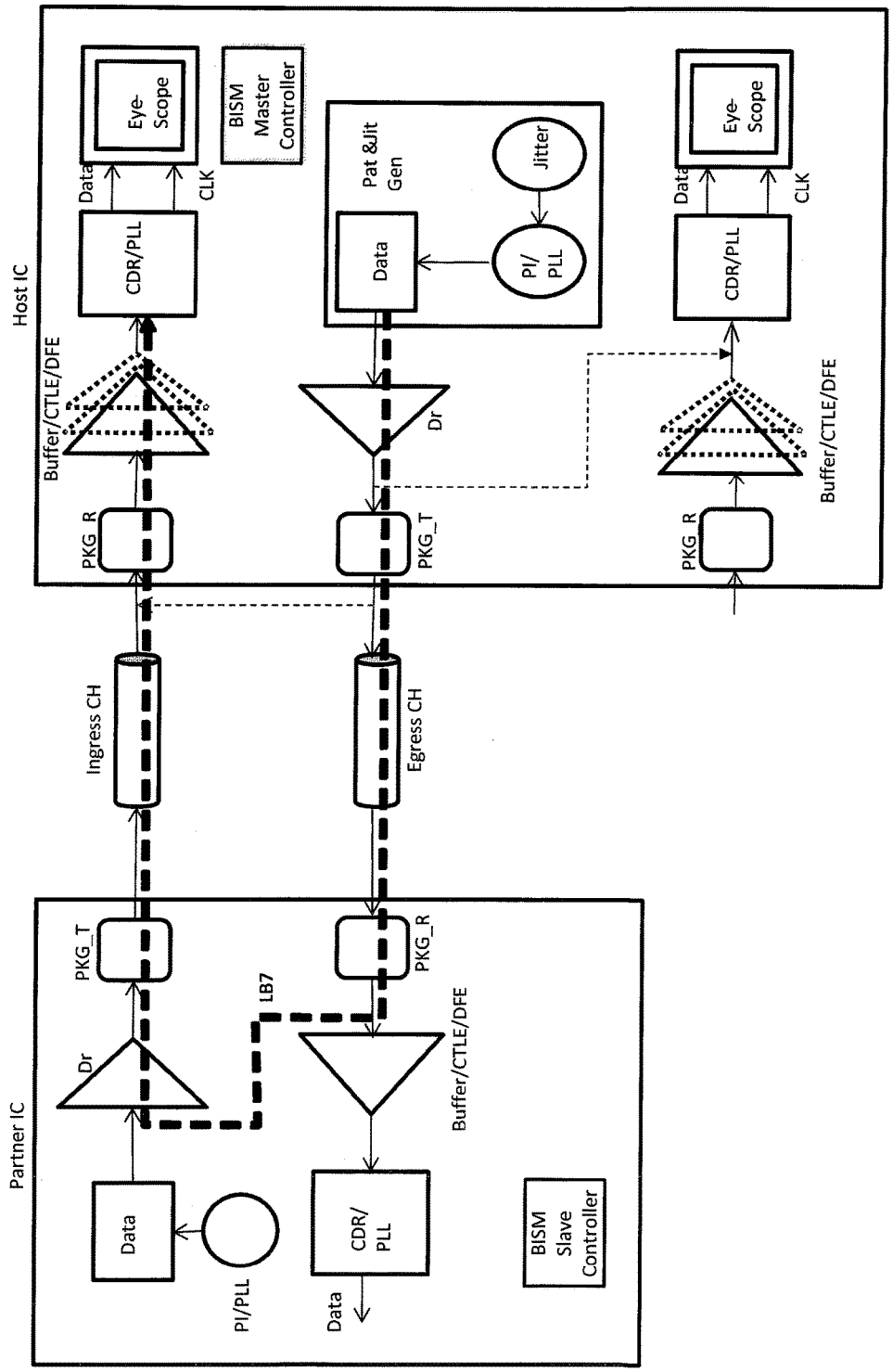
FIG. 6F depicts loopback circuit LB7 for the method of FIG. 5 in accordance with an embodiment of the invention.

A next step 512 of the method 500 involves performing a sixth calibration measurement using the loopback circuit LB7 which is depicted in FIG. 6F. As shown in FIG. 6F, the loopback circuit LB7 goes from the Pat & Jit Gen circuit in the Host IC, to the Dr circuit, to PKG_T, through Egress CH, to PKG_R of the Partner IC, to the Dr circuit, to PKG_T of the Partner IC, through Ingress CH, to PKG_R of the Host IC, to the combined Buffer/CTLE/DFE circuit, to the CDR/PLL circuit, and, finally, to the Eye-Scope circuit.

This sixth calibration measurement may be implemented by extending LB6 from FIG. 6E by connecting temporarily (using electronically-controllable switches) the path from PKG_R of the Partner IC to the input of the driver (Dr) circuit of the Partner IC, and providing the output of that Dr circuit to PKG_T of the Partner IC. This extended loopback circuit LB7 is shown in FIG. 6F. The BER bathtub curve is measured with the eye-scope circuits, and jitter components of the loopback circuit LB7 may be obtained from this BER bathtub curve. The difference in the jitter components determined using LB7 and those determined using LB6 provides the jitter components of the Dr circuit of the Partner IC.

Figure 6G:
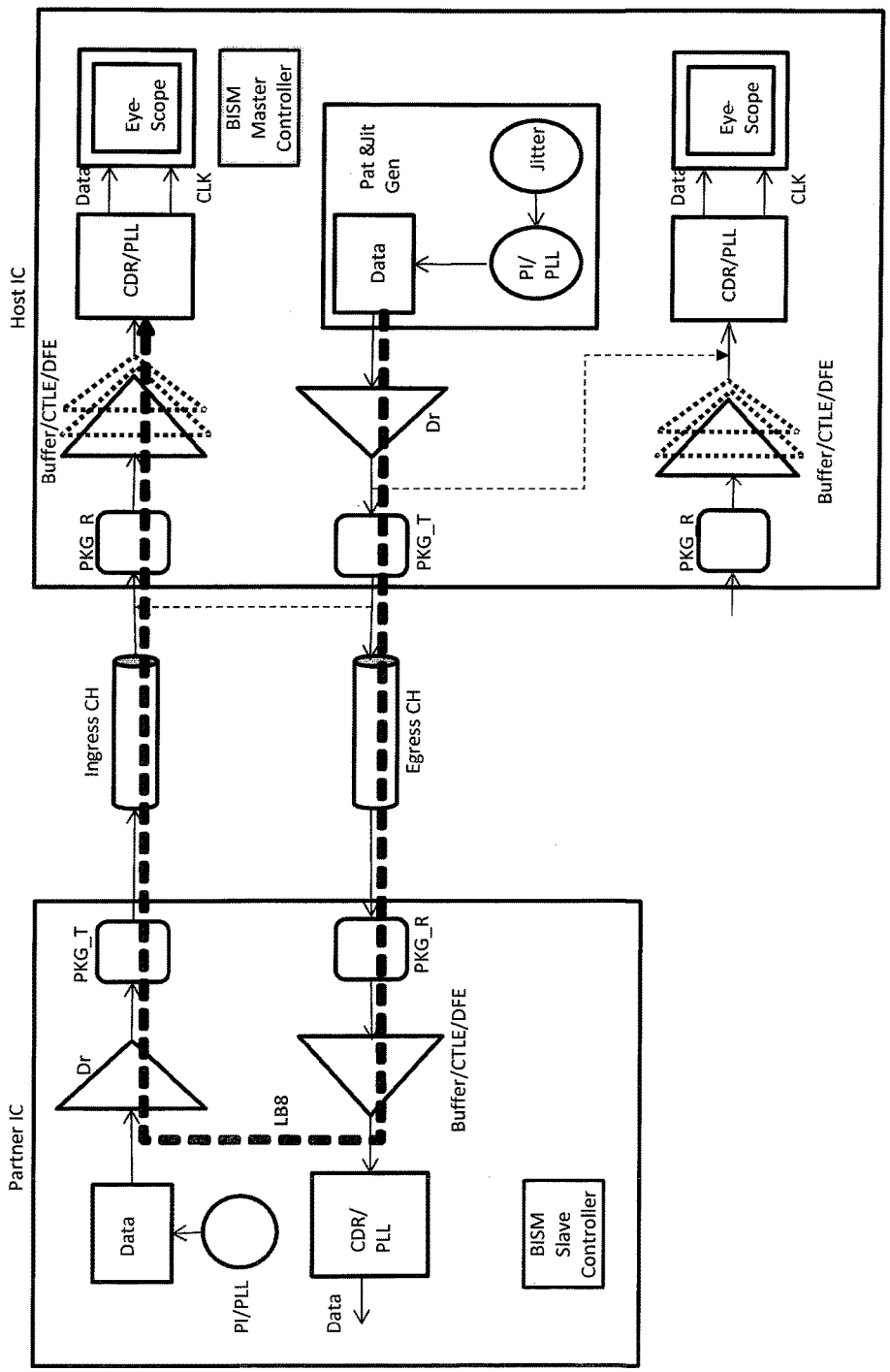
FIG. 6G depicts loopback circuit LB8 for the method of FIG. 5 in accordance with an embodiment of the invention.

A next step 514 of the method 500 involves performing a seventh calibration measurement using the loopback circuit LB8 which is depicted in FIG. 6G. As shown in FIG. 6g, the loopback circuit LB8 goes from the Pat & Jit Gen circuit in the Host IC, to the Dr circuit, to PKG_T, through Egress CH, to PKG_R of the Partner IC, to the combined Buffer/CTLE/DFE circuit, to the Dr circuit, to PKG_T of the Partner IC, through Ingress CH, to PKG_R of the Host IC, to the combined Buffer/CTLE/DFE circuit, to the CDR/PLL circuit, and, finally, to the Eye-Scope circuit.

This seventh calibration measurement may be implemented by extending LB7 from FIG. 6E by connecting temporarily (using electronically-controllable switches) the path from Buffer/CTLE/DFE of the Partner IC to the input of the driver (Dr) circuit of the Partner IC, and providing the output of that Dr circuit to PKG_T of the Partner IC. This extended loopback circuit LB8 is shown in FIG. 6G. The BER bathtub curve is measured with the eye-scope circuits, and jitter components of the loopback circuit LB8 may be obtained from this BER bathtub curve. The difference in the jitter components determined using LB7 and those determined using LB6 provides the jitter components of the Dr circuit of the Partner IC.

Finally, per step 516, using the above-discussed calibration measurements, the deterministic jitter (DJ) and random jitter (RJ) may be determined for each link component. In accordance with an embodiment of the invention, the procedure 700 described below in relation to FIG. 7 may be used for this step.

Figure 7:
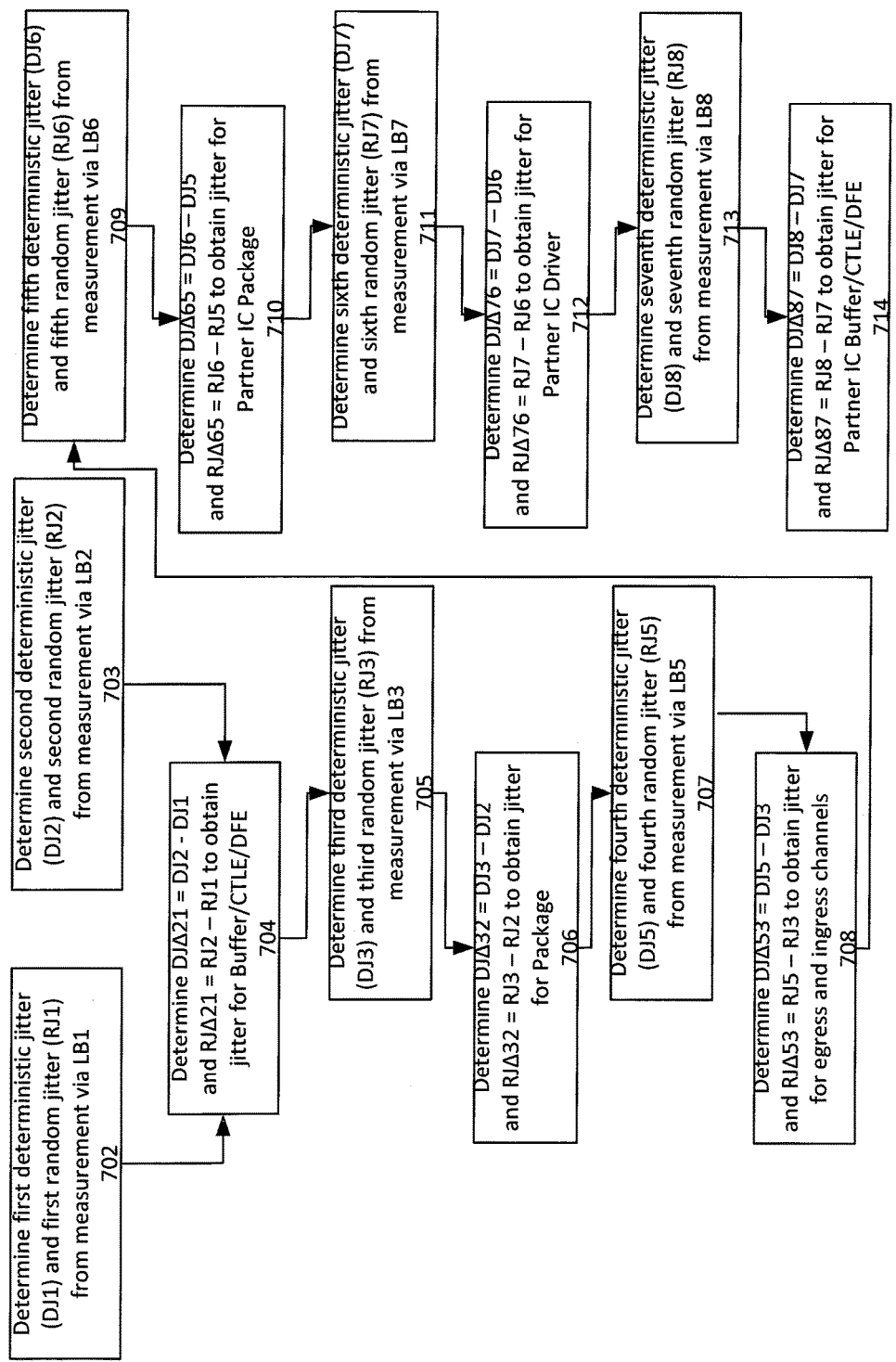
FIG. 7 is a flow chart of a procedure to determine deterministic and random jitter components using measurements from the method of FIG. 5 in accordance with an embodiment of the invention.

Per step 702 in FIG. 7, a first deterministic jitter (DJ1) and a first random jitter (RJ1) may be obtained from the first calibration measurement via LB1 (i.e. from step 502). DJ1 and RJ1 provide, respectively, the deterministic jitter floor and random jitter floor relating to the Pat & Jit Gen, Dr, CDR/PLL and Eye-Scope circuitry of the Host IC.

Per step 703, a second deterministic jitter (DJ2) and a second random jitter (RJ2) may be obtained from the second calibration measurement via LB2 (i.e. from step 504). DJ2 and RJ2 provide, respectively, the deterministic jitter and the random jitter relating to the Pat & Jit Gen, DR, Buffer/CTLE/DFE, CDR/PLL and Eye-Scope circuitry of the Host IC.

Per step 704, DJ$\Delta$21 may be calculated to be the difference between DJ2 and DJ1, and RJ$\Delta$21 may be calculated to be the difference between RJ2 and RJ1. The deterministic jitter for the combined Buffer/CTLE/DFE circuit of the Host IC is provided by DJ$\Delta$21, and the random jitter for the combined Buffer/CTLE/DFE circuit of the Host IC is provided by RJ$\Delta$21.

Per step 705, a third deterministic jitter (DJ3) and a third random jitter (RJ3) may be obtained from the third calibration measurement via LB3 (i.e. from step 506). DJ3 and RJ3 provide, respectively, the deterministic jitter and the random jitter relating to the Pat & Jit Gen, Dr, PKG_T, PKG_R, Buffer/CTLE/DFE, CDR/PLL and Eye-Scope circuitry of the Host IC.

Per step 706, DJ$\Delta$32 may be calculated to be the difference between DJ3 and DJ2, and RJ$\Delta$32 may be calculated to be the difference between RJ3 and RJ2. The deterministic jitter for the packaging (PKG_T and PKG_R) is provided by DJΔ32, and the random jitter for the packaging (PKG_T and PKG_R) i is provided by RJΔ32. For the case where the characteristics of the transmitter packaging (PKG_T) is known, this allows for the determination of the deterministic and random jitter components for PKG_R of the Host IC.

Per step 707, a fourth deterministic jitter (DJ5) and a fourth random jitter (RJ5) may be obtained from the fourth calibration measurement via LB5 (i.e. from step 508). DJ5 and RJ5 provide, respectively, the deterministic jitter and the random jitter relating to the Pat & Jit Gen, Dr, PKG_T, PKG_R, Buffer/CTLE/DFE, CDR/PLL and Eye-Scope circuitry of the Host IC plus the Egress CH and the Ingress CH.

Per step 708, DJΔ53 may be calculated to be the difference between DJ5 and DJ3, and RJΔ53 may be calculated to be the difference between RJ5 and RJ3. The deterministic jitter for the combined Egress CH and Ingress CH is provided by DJΔ53, and the random jitter for the combined Egress CH and Ingress CH is provided by RJΔ53.

Per step 709, a fifth deterministic jitter (DJ6) and a fifth random jitter (RJ6) may be obtained from the fifth calibration measurement via LB6 (i.e. from step 510). DJ6 and RJ6 provide, respectively, the deterministic jitter and the random jitter relating to the Pat & Jit Gen, Dr, PKG_T, PKG_R, Buffer/CTLE/DFE, CDR/PLL and Eye-Scope circuitry of the Host IC, plus the Egress CH and the Ingress CH, plus PKG_R and PKG_T of the Partner IC.

Per step 710, DJΔ65 may be calculated to be the difference between DJ6 and DJ5, and RJΔ65 may be calculated to be the difference between RJ6 and RJ5. The deterministic jitter for the combined PKG_R and PKG_T of the Partner IC is provided by DJΔ65, and the random jitter for the combined PKG_R and PKG_T of the Partner IC is provided by RJΔ65.

Per step 711, a sixth deterministic jitter (DJ7) and a sixth random jitter (RJ7) may be obtained from the sixth calibration measurement via LB7 (i.e. from step 512). DJ7 and RJ7 provide, respectively, the deterministic jitter and the random jitter relating to the Pat & Jit Gen, Dr, PKG_T, PKG_R, Buffer/CTLE/DFE, CDR/PLL and Eye-Scope circuitry of the Host IC, plus the Egress CH and the Ingress CH, plus PKG_R, PKG_T and Dr of the Partner IC.

Per step 712, DJΔ76 may be calculated to be the difference between DJ7 and DJ6, and RJΔ76 may be calculated to be the difference between RJ7 and RJ6. The deterministic jitter for the driver of the Partner IC is provided by DJΔ76, and the random jitter for the driver of the Partner IC is provided by RJΔ76.

Per step 713, a seventh deterministic jitter (DJ8) and a seventh random jitter (RJ8) may be obtained from the seventh calibration measurement via LB8 (i.e. from step 514). DJ8 and RJ8 provide, respectively, the deterministic jitter and the random jitter relating to the Pat & Jit Gen, Dr, PKG_T, PKG_R, Buffer/CTLE/DFE, CDR/PLL and Eye-Scope circuitry of the Host IC, plus the Egress CH and the Ingress CH, plus PKG_R, PKG_T, Dr, and Buffer/CTLE/DFE of the Partner IC.

Per step 714, DJΔ87 may be calculated to be the difference between DJ8 and DJ7, and RJΔ87 may be calculated to be the difference between RJ8 and RJ7. The deterministic jitter for the combined Buffer/CTLE/DFE circuit of the Partner IC is provided by DJΔ87, and the random jitter for the combined Buffer/CTLE/DFE circuit of the Partner IC is provided by RJΔ87.

Figure 8:
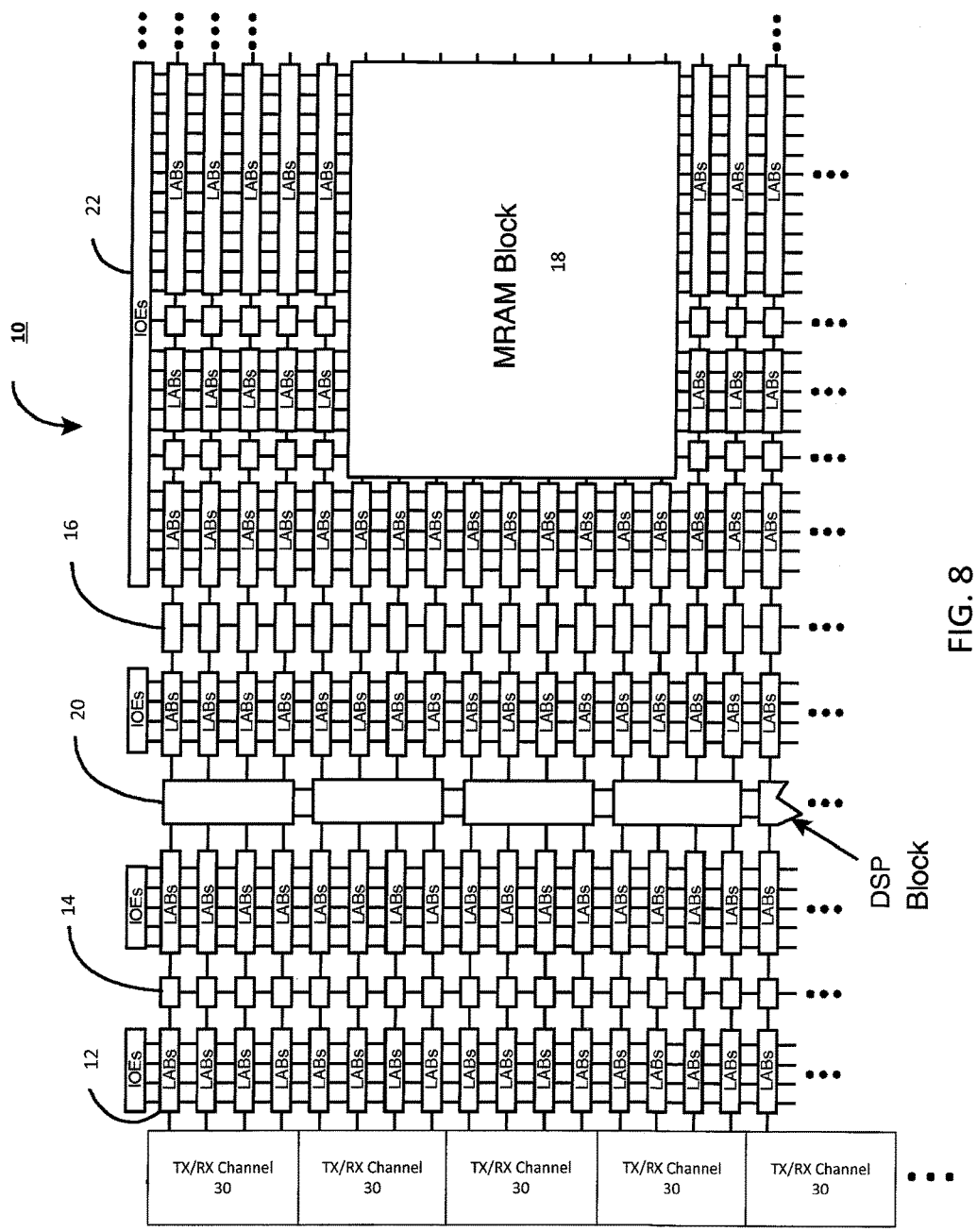
FIG. 8 is a block diagram depicting components of a field programmable gate array (FPGA) in accordance with an embodiment of the invention.

FIG. 8 is a simplified partial block diagram of a field programmable gate array (FPGA) 10 that may be configured with circuitry to implement an embodiment of the present invention. It should be understood that embodiments of the present invention can be used in numerous types of integrated circuits such as field programmable gate arrays (FPGAs), programmable logic devices (PLDs), complex programmable logic devices (CPLDs), programmable logic arrays (PLAs), digital signal processors (DSPs) and application specific integrated circuits (ASICs).

FPGA 10 includes within its "core" a two-dimensional array of programmable logic array blocks (or LABs) 12 that are interconnected by a network of column and row interconnect conductors of varying length and speed. LABs 12 include multiple (e.g., ten) logic elements (or LEs).

An LE is a programmable logic block that provides for efficient implementation of user defined logic functions. An FPGA has numerous logic elements that can be configured to implement various combinatorial and sequential functions. The logic elements have access to a programmable interconnect structure. The programmable interconnect structure can be programmed to interconnect the logic elements in almost any desired configuration.

FPGA 10 may also include a distributed memory structure including random access memory (RAM) blocks of varying sizes provided throughout the array. The RAM blocks include, for example, blocks 14, blocks 16, and block 18. These memory blocks can also include shift registers and FIFO buffers.

FPGA 10 may further include digital signal processing (DSP) blocks 20 that can implement, for example, multipliers with add or subtract features. Input/output elements (IOEs) 22 located, in this example, around the periphery of the chip support numerous single-ended and differential input/output standards. Each IOE 22 is coupled to an external terminal (i.e., a pin) of FPGA 10.

An array of transceivers (TX/RX) 30 may be included as shown, for example. The transceivers may include transmitter and receiver circuitry as described above in relation to FIG. 1.

It is to be understood that FPGA 10 is described herein for illustrative purposes only and that the present invention can be implemented in many different types of PLDs, FPGAs, and ASICs.

Figure 9:
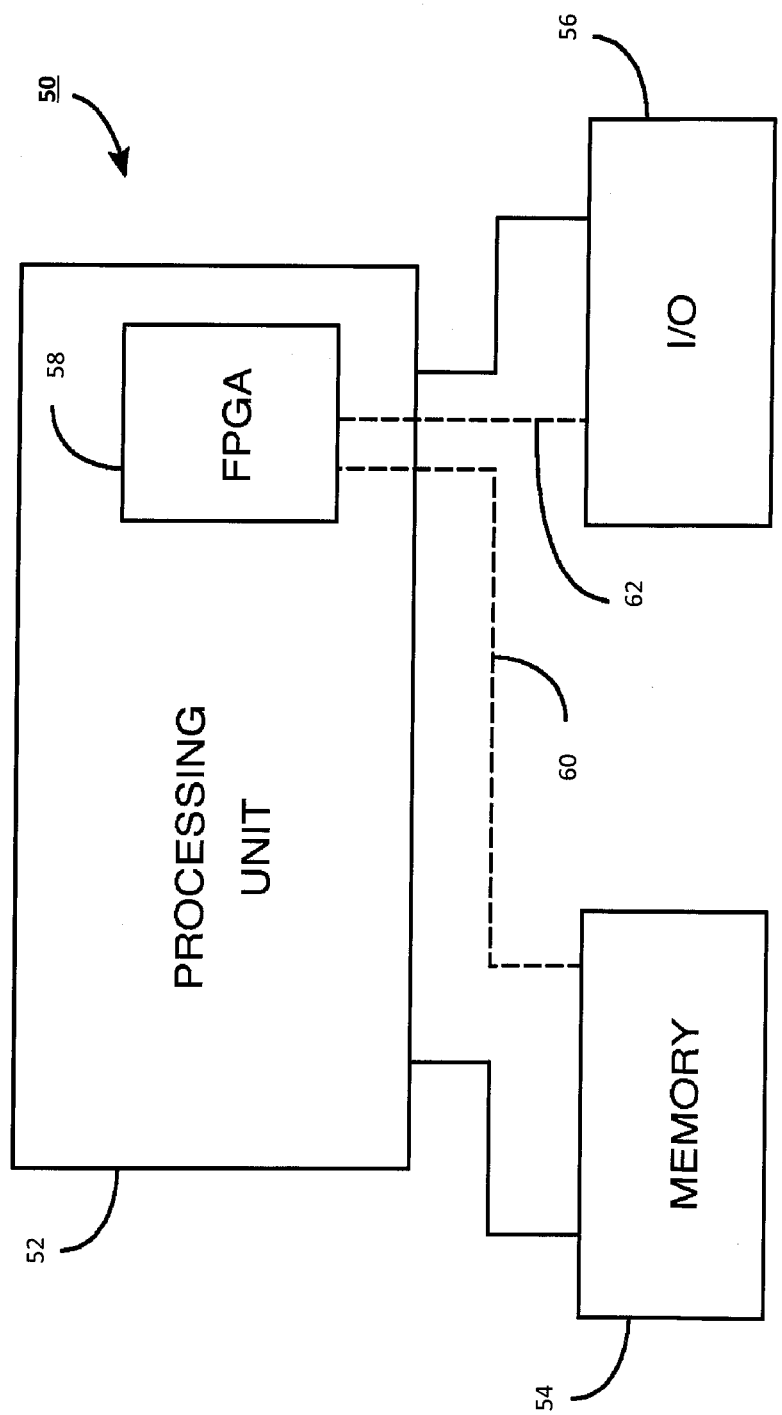
FIG. 9 shows a block diagram of an exemplary digital system that can embody techniques of the present invention.

FIG. 9 shows a block diagram of an exemplary digital system 50 that can embody techniques of the present invention. As shown, the exemplary digital system 50 may include an FPGA as one of several components.

System 50 may be a programmed digital computer system, digital signal processing system, specialized digital switching network, or other processing system. Moreover, such systems can be designed for a wide variety of applications such as telecommunications systems, automotive systems, control systems, consumer electronics, personal computers, Internet communications and networking, and others. Further, system 50 may be provided on a single board, on multiple boards, or within multiple enclosures.

System 50 includes a processing unit 52, a memory unit 54, and an input/output (I/O) unit 56 interconnected together by one or more buses. According to this exemplary embodiment, FPGA 58 is embedded in processing unit 52. FPGA 58 can serve many different purposes within the system 50. FPGA 58 can, for example, be a logical building block of processing unit 52, supporting its internal and external operations. FPGA 58 may be programmed to implement the logical functions necessary to carry on its particular role in system operation. FPGA 58 may be specially coupled to memory 54 through connection 60 and to I/O unit 56 through connection 62.

Processing unit 52 may direct data to an appropriate system component for processing or storage, execute a program stored in memory 54, receive and transmit data via I/O unit 56, or other similar function. Processing unit 52 may be a central processing unit (CPU), microprocessor, floating point coprocessor, graphics coprocessor, hardware controller, microcontroller, field programmable gate array programmed for use as a controller, network controller, or any type of processor or controller. Furthermore, in many embodiments, there is often no need for a CPU.

For example, instead of a CPU, one or more FPGAs 58 may control the logical operations of the system. As another example, FPGA 58 acts as a reconfigurable processor that may be reprogrammed as needed to handle a particular computing task. Alternately, FPGA 58 may itself include an embedded microprocessor. Memory unit 54 may be a random access memory (RAM), read only memory (ROM), fixed or flexible disk media, flash memory, tape, or any other storage means, or any combination of these storage means.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc.

In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize. These modifications may be made to the invention in light of the above detailed description.

What is claimed is:

1. A method for built-in self-measurement of intrinsic jitter of link components using circuitry on a host integrated circuit that includes a transmitter and a receiver, the method comprising:
   adding jitter to a data pattern signal to form a jittery data pattern signal;
   using switches to form a first loopback circuit within the host integrated circuit from the transmitter of the host integrated circuit to the receiver of the host integrated circuit, wherein the first loopback circuit comprises a first group of link components;
   transmitting a jittery data pattern signal through the first loopback circuit;
   measuring a first deterministic jitter and a first random jitter using the first loopback circuit;
   using switches to form a second loopback circuit within the host integrated circuit from the transmitter of the host integrated circuit to the receiver of the host integrated circuit, wherein the second loopback circuit comprises the first group of link components and a second group of link components;
   transmitting the jittery data pattern signal through the second loopback circuit;
   measuring a second deterministic jitter and a second random jitter using the second loopback circuit;
   calculating a deterministic jitter of the second group of link components by subtracting the first deterministic jitter from the second deterministic jitter and a random jitter of the second group of link components by subtracting the first random jitter from the second random jitter;
   using switches to form a third loopback circuit from the transmitter of the host integrated circuit to the receiver of the host integrated circuit, wherein the third loopback circuit comprises the first group of link components, the second group of link components, and a third group of link components;
   transmitting the jittery data pattern signal through the third loopback circuit;
   measuring a third deterministic jitter and a third random jitter using the third loopback circuit;
   calculating a deterministic jitter of the third group of link components by subtracting the second deterministic jitter from the third deterministic jitter and a random jitter of the third group of link components by subtracting the second random jitter from the third random jitter;
   using switches to form a fourth loopback circuit from the transmitter of the host integrated circuit to the receiver of the host integrated circuit, wherein the fourth loopback circuit comprises the first group of link components, the second group of link components, the third group of link components, and a fourth group of link components;
   transmitting the jittery data pattern signal through the fourth loopback circuit;
   measuring a fourth deterministic jitter and a fourth random jitter using the fourth loopback circuit; and
   calculating a deterministic jitter of the fourth group of link components by subtracting the third deterministic jitter from the fourth deterministic jitter and a random jitter of the fourth group of link components by subtracting the third random jitter from the fourth random jitter.

2. The method of claim 1,
   wherein the first group of link components comprises an on-die instrumentation pattern and jitter generation circuit, a driver circuit of the transmitter of the host integrated circuit and a clock data recovery circuit of the receiver of the host integrated circuit,
   wherein the second group of link components comprises buffer and equalization circuits of the receiver of the host integrated circuit,
   wherein the third group of link components comprises transmitter and receiver packaging components of the host integrated circuit, and
   wherein the fourth group of link components comprises a channel that is external to the host integrated circuit.

3. The method of claim 1,
   wherein the first group of link components comprises an on-die instrumentation pattern and jitter generation circuit, a driver circuit of the transmitter of the host integrated circuit and a clock data recovery circuit of the receiver of the host integrated circuit,
   wherein the second group of link components comprises buffer and equalization circuits of the receiver of the host integrated circuit,
   wherein the third group of link components comprises transmitter and receiver packaging components of the host integrated circuit, and
   wherein the fourth group of link components comprises an egress channel to a receiver of a partner integrated circuit and an ingress channel from a transmitter of the partner integrated circuit.

4. The method of claim 1, further comprising:
   using switches to form a fifth loopback circuit from the transmitter of the host integrated circuit to the receiver of the host integrated circuit, wherein the fifth loopback circuit comprises the first group of link components, the second group of link components, the third group of link components, and the fourth group of link components, and a fifth group of link components;

transmitting the jittery data pattern signal through the fifth loopback circuit;

measuring a fifth deterministic jitter and a fifth random jitter using the fifth loopback circuit; and calculating a deterministic jitter of the fifth group of link components by subtracting the fourth deterministic jitter from the fifth deterministic jitter and a random jitter of the fifth group of link components by subtracting the fourth random jitter from the fifth random jitter.

5. The method of claim 4, wherein the first group of link components comprises an on-die instrumentation pattern and jitter generation circuit, a driver circuit of the transmitter of the host integrated circuit and a clock data recovery circuit of the receiver of the host integrated circuit, wherein the second group of link components comprises buffer and equalization circuits of the receiver of the host integrated circuit, wherein the third group of link components comprises transmitter and receiver packaging components of the host integrated circuit, wherein the fourth group of link components comprises an egress channel to a receiver of a partner integrated circuit and an ingress channel from a transmitter of the partner integrated circuit, and wherein the fifth group of link components comprises transmitter and receiver packaging components of the partner integrated circuit.

6. The method of claim 4, further comprising:

using switches to form a sixth loopback circuit from the transmitter of the host integrated circuit to the receiver of the host integrated circuit, wherein the sixth loopback circuit comprises the first group of link components, the second group of link components, the third group of link components, and the fourth group of link components, the fifth group of link components, and a sixth group of link components;

transmitting the jittery data pattern through the sixth loopback circuit;

measuring a sixth deterministic jitter and a sixth random jitter using the sixth loopback circuit; and calculating a deterministic jitter of the sixth group of link components by subtracting the fifth deterministic jitter from the sixth deterministic jitter and a random jitter of the sixth group of link components by subtracting the fifth random jitter from the sixth random jitter.

7. The method of claim 6, wherein the first group of link components comprises an on-die instrumentation pattern and jitter generation circuit, a driver circuit of the transmitter of the host integrated circuit and a clock data recovery circuit of the receiver of the host integrated circuit, wherein the second group of link components comprises buffer and equalization circuits of the receiver of the host integrated circuit, wherein the third group of link components comprises transmitter and receiver packaging components of the host integrated circuit, wherein the fourth group of link components comprises an egress channel to a receiver of a partner integrated circuit and an ingress channel from a transmitter of the partner integrated circuit, wherein the fifth group of link components comprises transmitter and receiver packaging components of the partner integrated circuit, and wherein the sixth group of link components comprises a driver circuit of a transmitter of the partner integrated circuit.

8. The method of claim 6, further comprising:

using switches to form a seventh loopback circuit from the transmitter of the host integrated circuit to the receiver of the host integrated circuit, wherein the seventh loopback circuit comprises the first group of link components, the second group of link components, the third group of link components, and the fourth group of link components, the fifth group of link components, the sixth group of link components, and a seventh group of link components;

transmitting the jittery data pattern signal through the seventh loopback circuit;

measuring a seventh deterministic jitter and a seventh random jitter using the seventh loopback circuit; and calculating a deterministic jitter of the seventh group of link components by subtracting the sixth deterministic jitter from the seventh deterministic jitter and a random jitter of the seventh group of link components by subtracting the sixth random jitter from the seventh random jitter.

9. The method of claim 8, wherein the first group of link components comprises an on-die instrumentation pattern and jitter generation circuit, a driver circuit of the transmitter of the host integrated circuit and a clock data recovery circuit of the receiver of the host integrated circuit, wherein the second group of link components comprises buffer and equalization circuits of the receiver of the host integrated circuit, wherein the third group of link components comprises transmitter and receiver packaging components of the host integrated circuit, wherein the fourth group of link components comprises an egress channel to a receiver of a partner integrated circuit and an ingress channel from a transmitter of the partner integrated circuit, wherein the fifth group of link components comprises transmitter and receiver packaging components of the partner integrated circuit, wherein the sixth group of link components comprises a driver circuit of a transmitter of the partner integrated circuit, and wherein the seventh group of link components comprises buffer and equalization circuits of a receiver of the partner integrated circuit.

* * * * *